United States Patent
Okai et al.

(10) Patent No.: US 9,978,521 B2
(45) Date of Patent: May 22, 2018

(54) MULTILAYER ELECTRONIC COMPONENT

(71) Applicant: TDK CORPORATION, Tokyo (JP)

(72) Inventors: Keisuke Okai, Tokyo (JP); Makoto Endo, Tokyo (JP); Hiroshi Shindo, Tokyo (JP); Yui Sugiura, Tokyo (JP); Tomomichi Gunji, Tokyo (JP); Yohei Noda, Tokyo (JP); Hirobumi Tanaka, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days. days.

(21) Appl. No.: 15/265,268

(22) Filed: Sep. 14, 2016

(65) Prior Publication Data
US 2017/0076867 A1 Mar. 16, 2017

(30) Foreign Application Priority Data

Sep. 15, 2015 (JP) .................................. 2015-182067
Jul. 25, 2016 (JP) .................................. 2016-145668

(51) Int. Cl.
*H01G 4/30* (2006.01)
*H01G 4/242* (2006.01)
*H01G 4/232* (2006.01)
*H01G 4/012* (2006.01)
*H01G 4/12* (2006.01)

(52) U.S. Cl.
CPC ............... *H01G 4/30* (2013.01); *H01G 4/012* (2013.01); *H01G 4/12* (2013.01); *H01G 4/232* (2013.01); *H01G 4/242* (2013.01)

(58) Field of Classification Search
None
See application file for complete search history.

(56) References Cited

U.S. PATENT DOCUMENTS

| | | | | |
|---|---|---|---|---|
| 6,475,307 B1* | 11/2002 | Nystrom | ............... | C21D 8/005 148/325 |
| 8,325,462 B2* | 12/2012 | Abe | ............... | H01G 4/012 361/303 |
| 8,804,305 B2* | 8/2014 | Kim | ............... | H01G 4/232 361/311 |
| 9,123,472 B2* | 9/2015 | Kim | ............... | H01G 4/005 |
| 9,177,722 B2* | 11/2015 | Kim | ............... | H01G 4/12 |
| 2010/0085682 A1* | 4/2010 | Abe | ............... | H01G 4/012 361/303 |
| 2012/0229949 A1* | 9/2012 | Kim | ............... | H01G 4/005 361/321.2 |
| 2016/0351335 A1* | 12/2016 | Kato | ............... | H01G 4/30 |

FOREIGN PATENT DOCUMENTS

JP    2012-191159 A    10/2012

* cited by examiner

Primary Examiner — Dion R Ferguson
(74) Attorney, Agent, or Firm — Oliff PLC

(57) ABSTRACT

A multilayer electronic component includes an element body having an internal electrode layer and a dielectric layer. These layers are substantially parallel to a plane including a first axis and a second axis and are alternately laminated along a third axis direction. A pair of side surfaces facing each other in the first axis direction of the element body is respectively equipped with an insulating layer. A pair of end surfaces facing each other in the second axis direction of the element body is respectively equipped with an external electrode electrically connected to the internal electrode layer. The insulating layer has a mountain portion formed on a peripheral edge of the side surface and a plane portion of a central portion of the side surface.

3 Claims, 16 Drawing Sheets

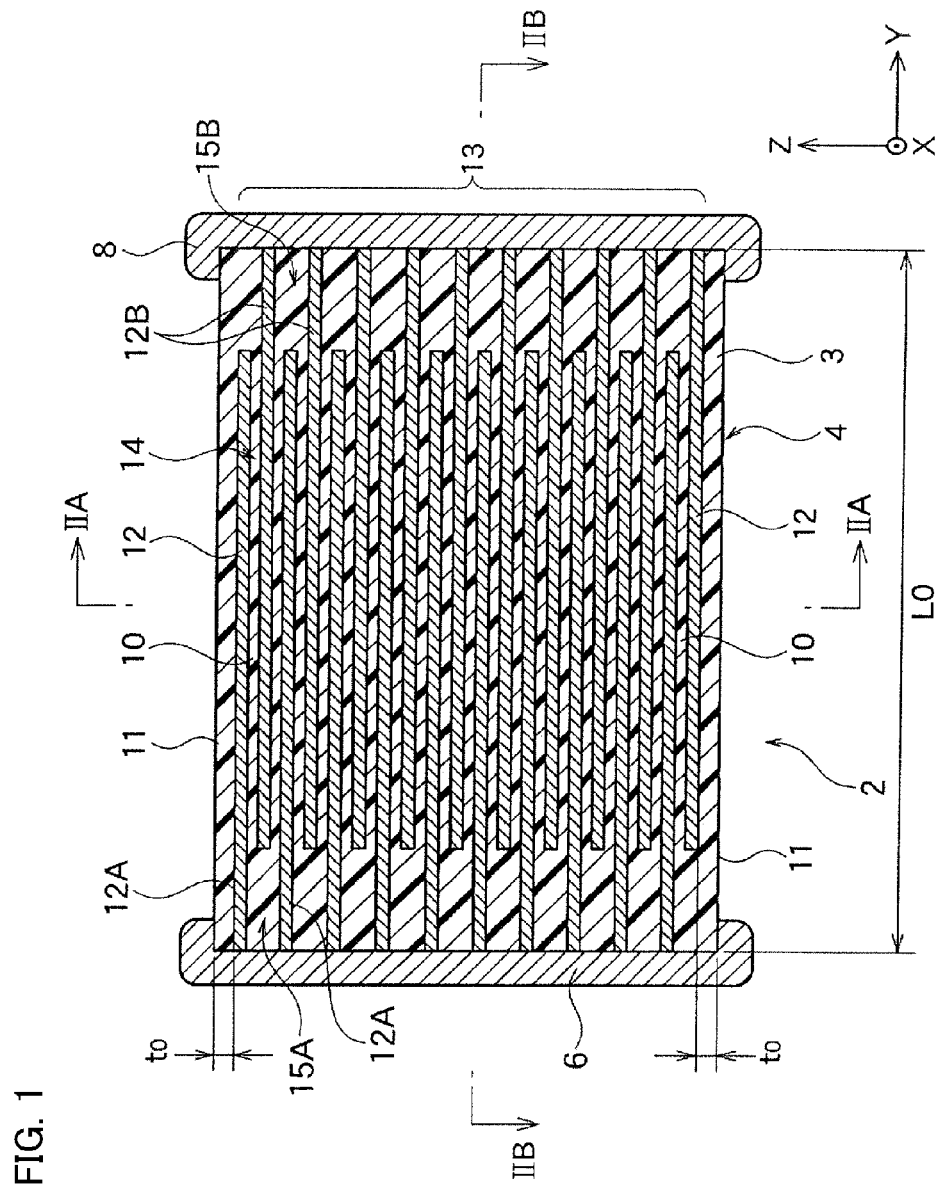

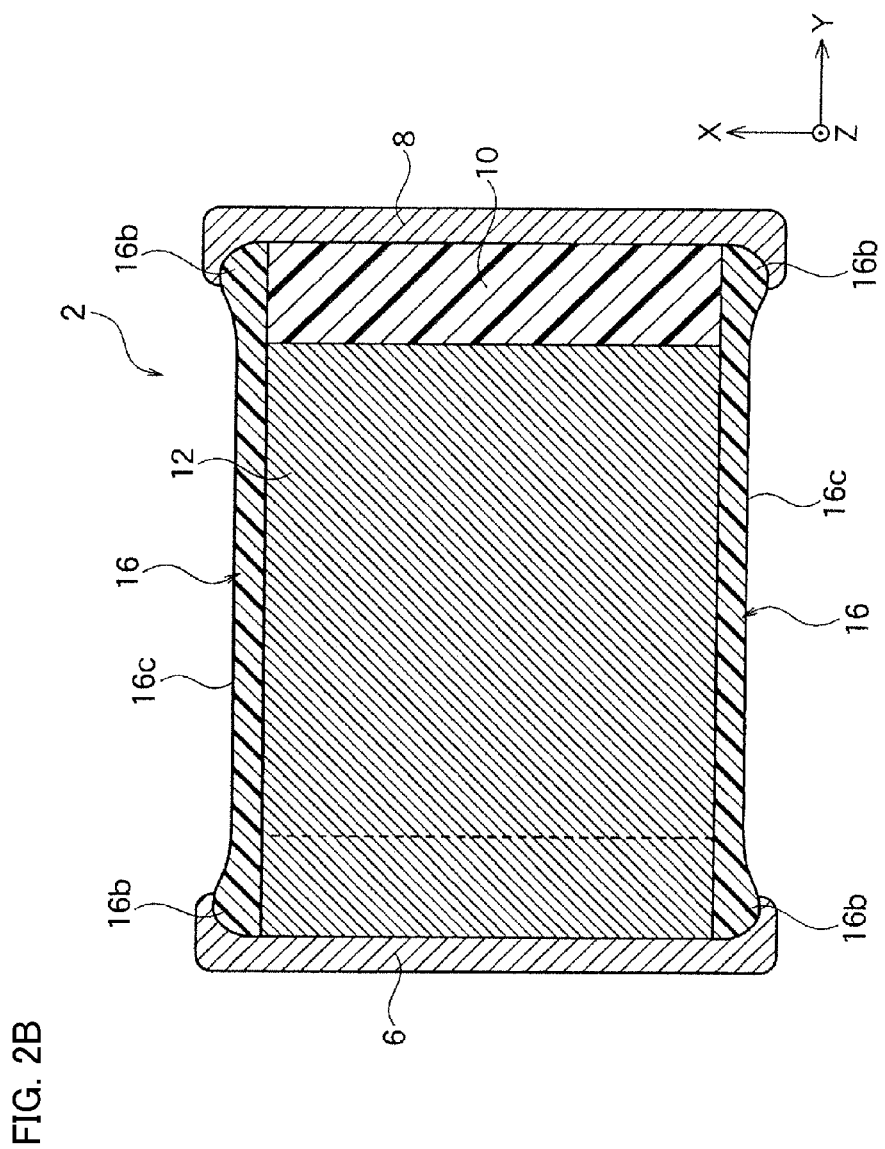

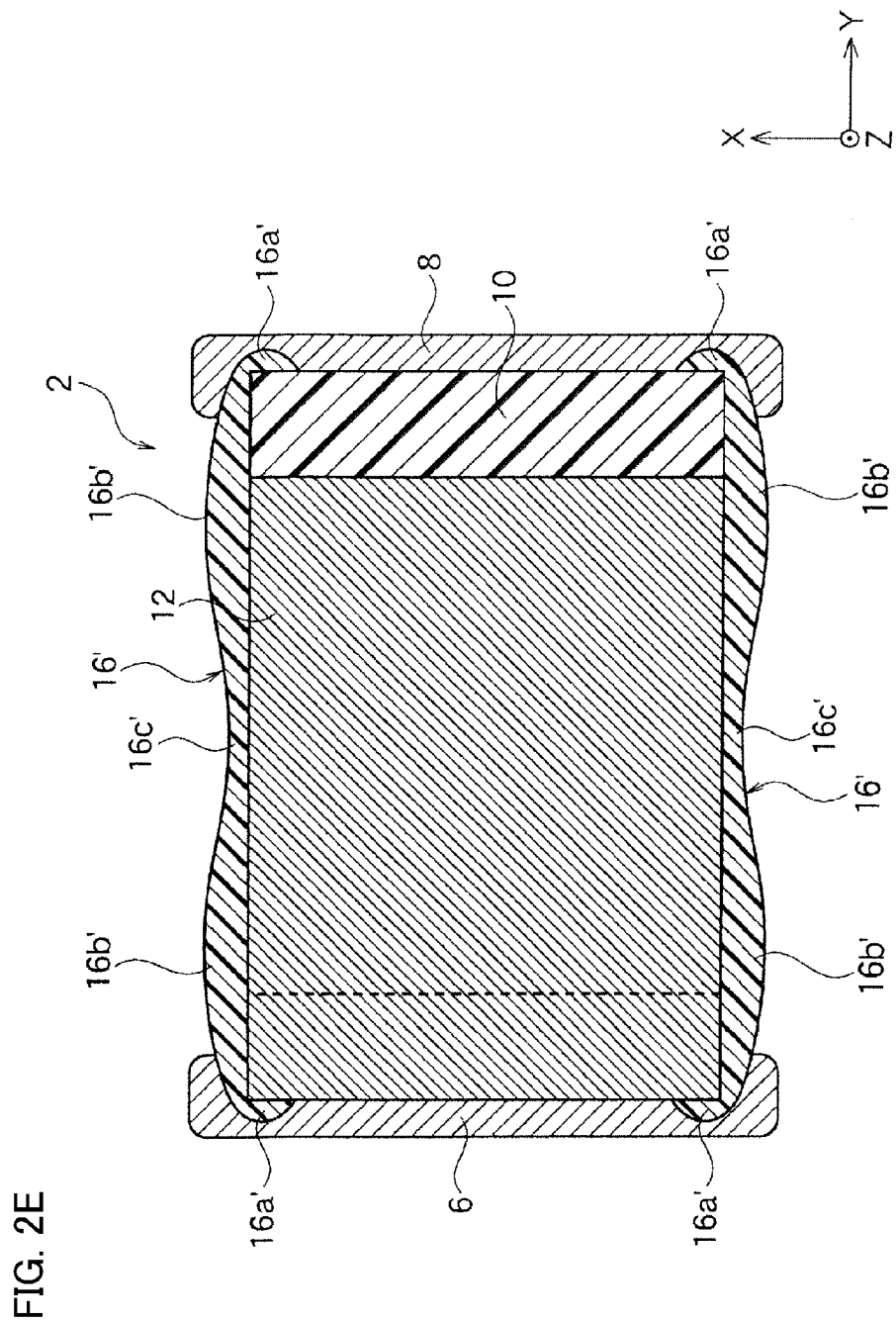

FIG. 3B
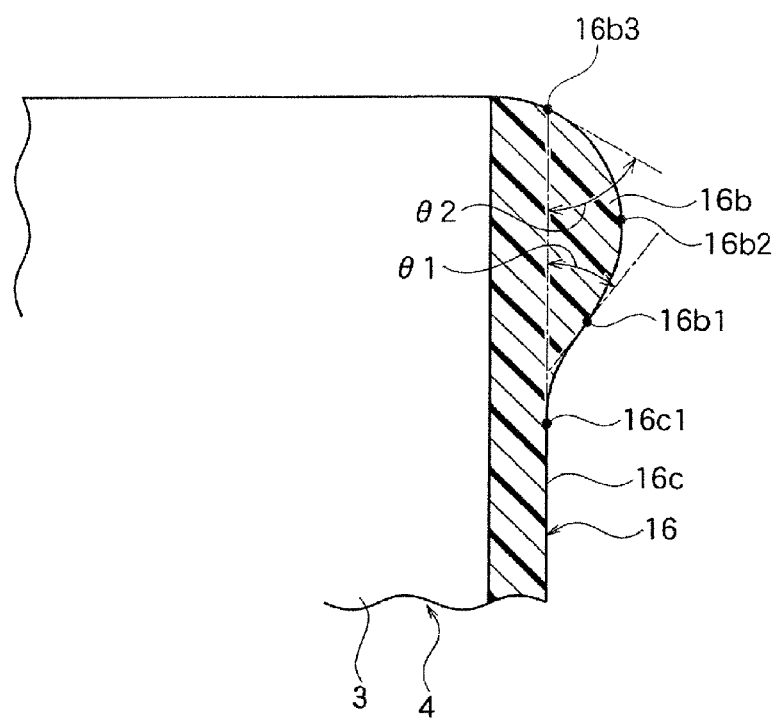
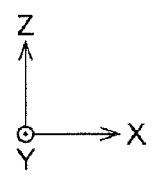

n – TH LAYER n+1 – TH LAYER

MULTILAYER ELECTRONIC COMPONENT

BACKGROUND OF THE INVENTION

1. Field of the Invention

The present invention relates to a multilayer electronic component.

2. Description of the Related Art

In recent years, a demand for miniaturization of electronic parts associated with the high densification of electronic circuits used in digital electronic devices such as mobile phones has increased, and the miniaturization and capacity enlargement of multilayer electronic components constituting the circuits have been rapidly advanced.

In a multilayer electronic component such as a multilayer ceramic capacitor, a plurality of internal electrodes is arranged in an element body. In Patent Document 1, a plurality of rectangular ceramic green sheets where a conductive paste is printed over the entire width of the ceramic green sheets is laminated and cut to obtain a laminated body where end edges on the both sides of a conductive layer is exposed is obtained.

Then, in Patent Document 1, the laminated body is fired to obtain a ceramic sintered body the end edges of the conductive layer are exposed to not only end surfaces to be connected to external electrodes but to a pair of side surfaces. Next, a ceramic is applied and formed on the side surfaces of the ceramic sintered body.

However, when a ceramic is baked on side surfaces of a multilayer ceramic electronic component, electrostriction is easy to cause structural defects of a capacitor and external stress is hard to be reduced due to bad adhesion between the side surfaces and the ceramic (side gap) applied and formed thereon, thereby there is a problem in fixing strength.

Patent Document 1: JP 2012-191159 A

SUMMARY OF THE INVENTION

The present invention has been made in view of the above circumstances, and an object thereof is to provide a multilayer electronic component having favorable fixing strength.

Means for Solving Problem

In order to achieve the above object, the multilayer electronic component according to a first aspect of the present invention is as follows.

[1] A multilayer electronic component including an element body having an internal electrode layer and a dielectric layer, both of which are substantially parallel to a plane including a first axis and a second axis and are alternately laminated along a third axis direction, wherein a pair of end surface (side surfaces) facing each other in the first axis direction of the element body is respectively equipped with an insulating layer, a pair of end surfaces facing each other in the second axis direction of the element body is respectively equipped with an external electrode electrically connected to the internal electrode layer, the insulating layer has a mountain portion formed on a peripheral edge of the side surface and a plane portion of a central portion of the side surface, $\theta 1$ is 5° to 25°, where $\theta 1$ denotes an angle made by a surface virtual line along a surface of the plane portion of the insulating layer and a tangential line of a curved surface at a first inner predetermined position of the mountain portion, and $\theta 2$ is 5° to 25°, where $\theta 2$ denotes an angle made by the surface virtual line and a tangential line of a curved surface at a first outer predetermined position of the mountain portion.

According to the present invention, the angle made by a surface virtual line along a surface of the plane portion of the insulating layer and a tangential line of a curved surface at a first inner predetermined position of the mountain portion and the angle made by the surface virtual line and a tangential line of a curved surface at a first outer predetermined position are within a predetermined range, and it is thus possible to provide a multilayer electronic component having favorable thermal shock resistance and fixing strength.

To achieve the above object, a multilayer electronic component according to a second aspect of the present invention is as follows.

[2] A multilayer electronic component including an element body having an internal electrode layer and a dielectric layer, both of which are substantially parallel to a plane including a first axis and a second axis and are alternately laminated along a third axis direction, wherein a pair of end surfaces (side surfaces) facing each other in the first axis direction of the element body is respectively equipped with an insulating layer, a pair of end surfaces facing each other in the second axis direction of the element body is respectively equipped with an external electrode electrically connected to the internal electrode layer, the insulating layer has a mountain portion formed on a peripheral edge of the side surface and a plane portion of a central portion of the side surface, and the external electrode covers a portion having a maximum width in the first axis direction at the mountain portion of an end portion in the second axis direction of the insulating layer.

According to the present invention, the external electrode covers the portion having the maximum width in the first axis direction at the mountain portion of the end portion in the second axis direction of the insulating layer, and it is thus possible to provide a multilayer electronic component having favorable fixing strength.

As a specific aspect of [2] above, the following aspects are exemplified.

[3] The multilayer electronic component according to [2], in which $1/30 \leq \alpha/\beta < 1$ is satisfied, where $\alpha$ denotes a length along the second axis direction from an end portion in the second axis direction of the element body to the portion having the maximum width in the first axis direction at the mountain portion of the end portion in the second axis direction of the insulating layer and $\beta$ denotes a covering length along the second axis direction of the external electrode covering the insulating layer from the end portion in the second axis direction of the element body.

In addition, the method for manufacturing a multilayer electronic component for achieving the above object is not particularly limited, but examples thereof may include the following manufacturing method.

[4] A method for manufacturing the multilayer electronic component, the method including a step of obtaining a green laminate by laminating a green sheet having an internal electrode pattern layer that is continuous in a first axis direction and is substantially parallel to a plane including a first axis and a second axis formed in a third axis direction, a step of obtaining a green chip by cutting the green laminate so as to obtain a cutting plane parallel to a plane including a second axis and a third axis, a step of obtaining an element body having an internal electrode layer and a dielectric layer alternately laminated by calcining the green chip, a step of obtaining a ceramic sintered body having an insulating layer formed by coating and baking a paste for insulating layer on an end surface in the first axial direction of the element body, and a step of obtaining a multilayer electronic component where an external electrode is formed by baking a paste for external layer on an end surface in the second axial direction of the ceramic sintered body, in which the insulating layer has a mountain portion formed on a peripheral edge of the side surface and a plane portion of a central portion of the side surface, $\theta 1$ is 5° to 25°, where $\theta 1$ denotes an angle made by a surface virtual line along a surface of the plane portion of the insulating layer and a tangential line of a curved surface at a first inner predetermined position of the mountain portion, and $\theta 2$ is 5° to 25°, where $\theta 2$ denotes an angle made by the surface virtual line and a tangential line of a curved surface at a first outer predetermined position of the mountain portion.

To achieve the above object, a multilayer electronic component according to a third aspect of the present invention is as follows.

[5] A multilayer electronic component comprising an element body having an internal electrode layer and a dielectric layer, both of which are substantially parallel to a plane including a first axis and a second axis and are alternately laminated along a third axis direction, wherein a pair of side surfaces facing each other in the first axis direction of the element body is respectively equipped with an insulating layer, a pair of end surfaces facing each other in the second axis direction of the element body is respectively equipped with an external electrode electrically connected to the internal electrode layer, the insulating layer has a mountain portion formed on a peripheral edge of the side surface and a valley portion of a central portion of the side surface, $\theta 1'$ is 5° to 25°, where $\theta 1'$ denotes an angle made by a vertical virtual line vertical to the first axis of the insulating layer and a tangential line of a curved surface at a second inner predetermined position of the mountain portion, and $\theta 2'$ is 5° to 25°, where $\theta 2'$ denotes an angle made by the vertical virtual line and a tangential line of a curved surface at a second outer predetermined position of the mountain portion.

BRIEF DESCRIPTION OF THE DRAWINGS

FIG. 1 is a schematic cross-sectional view of the multilayer ceramic capacitor according to an embodiment of the present invention.

FIG. 2B is a cross-sectional view taken along the line IIB-IIB illustrated in FIG. 1.

FIG. 2E is a cross-sectional view taken along the line IIB-IIB illustrated in FIG. 1.

FIG. 3B is a fragmentary cross-sectional view of FIG. 2A.

FIG. 5Ab is a plan view illustrating a portion of the (n+1)-th internal electrode pattern layer.

DESCRIPTION OF THE PREFERRED EMBODIMENTS

Figure 2A:
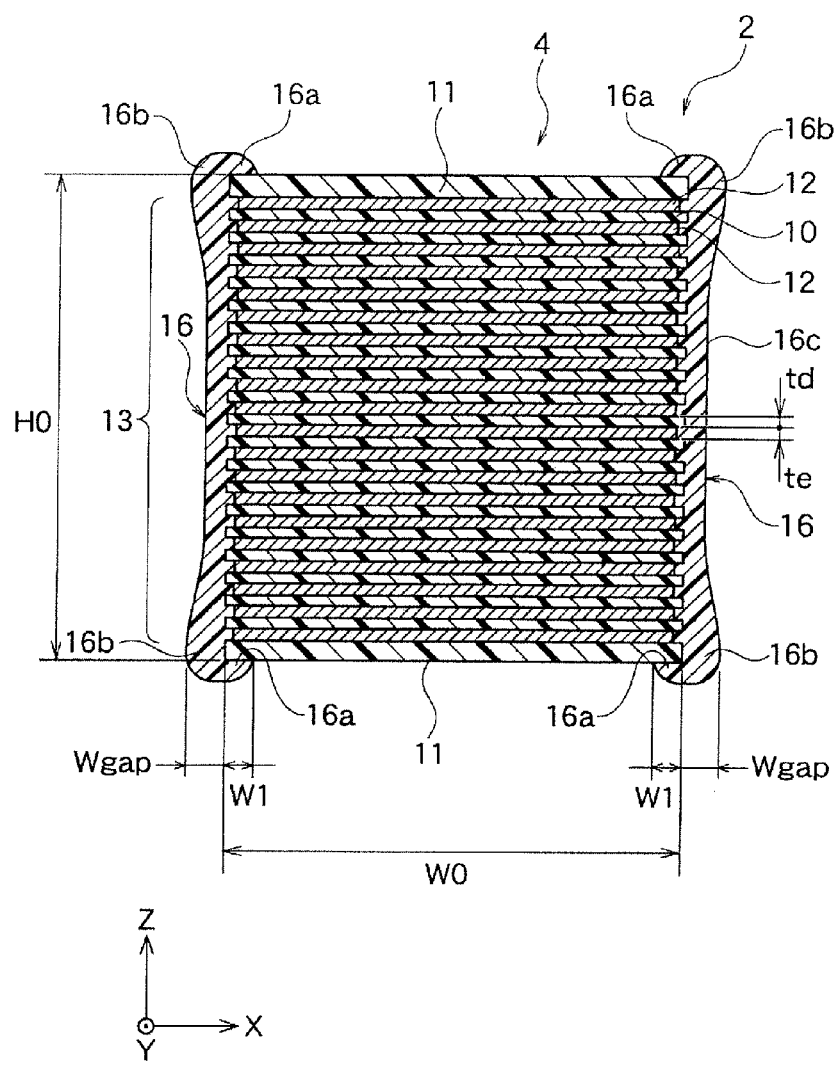
FIG. 2A is a cross-sectional view taken along the line IIA-IIA illustrated in FIG. 1.

The present invention will be described in detail based on the present embodiment with reference to the drawings, but the present invention is not limited to the embodiment to be described below.

In addition, the constituents to be described below include those that can be easily presumed by those skilled in the art and those that are substantially the same with one another. Furthermore, the constituents to be described below can be appropriately combined with one another.

Hereinafter, the present invention will be described based on the embodiment illustrated in the drawings.

First Embodiment

Overall Configuration of Multilayer Ceramic Capacitor

As an embodiment of the laminated electronic component according to the present embodiment, the overall configuration of a multilayer ceramic capacitor will be described.

As illustrated in FIG. 1, a multilayer ceramic capacitor 2 according to the present embodiment includes a ceramic sintered body 4, a first external electrode 6, and a second external electrode 8. In addition, the ceramic sintered body 4 has an element body 3 and an insulating layer 16.

The element body 3 has an inner dielectric layer 10 and an internal electrode layer 12 which are substantially parallel to a plane including an X-axis and a Y-axis, and the internal electrode layer 12 is alternately laminated between the inner dielectric layers 10 along a Z-axis direction. Here, the term "substantially parallel" means that the most part is parallel but there may be a part that is not parallel, and it intends that the internal electrode layer 12 and the inner dielectric layer 10 may be a little irregular or tilted.

As shown in FIG. 2A, the portion at which the inner dielectric layer 10 and the internal electrode layer 12 are alternately laminated is an interior region 13.

In addition, the element body 3 has an exterior region 11 on both end surfaces in the laminating direction Z (Z-axis) thereof. The exterior region 11 is formed by laminating a plurality of outer dielectric layers that are thicker than the inner dielectric layer 10 constituting the interior region 13.

Incidentally, hereinafter, the "inner dielectric layer 10" and the "outer dielectric layer" are collectively referred to as the "dielectric layer" in some cases.

The material for the inner dielectric layer 10 and the dielectric layer constituting the exterior region 11 may be the same as or different from each other, and it is not particularly limited, and for example, they may be constituted to contain a dielectric material having a perovskite structure such as $ABO_3$ or an alkali niobate-based ceramic as a main component.

In $ABO_3$, for example, A is at least one kind such as Ca, Ba, or Sr, and B is at least one kind such as Ti or Zr. The molar ratio of A/B is not particularly limited, and it is from 0.980 to 1.020.

In addition to this, examples of an accessory component may include silicon dioxide, aluminum oxide, magnesium oxide, an alkali metal compound, an alkaline earth metal compound, manganese oxide, a rare earth element oxide, and vanadium oxide, but it is not limited to these. The content thereof may also be appropriately determined in accordance with the composition and the like.

Incidentally, it is possible to lower the calcination temperature by using silicon dioxide and aluminum oxide as the accessory component. In addition, the lifespan can be improved by using magnesium oxide, an alkali metal compound, an alkaline earth metal compound, manganese oxide, a rare earth element oxide, and vanadium oxide as the accessory component.

The number of lamination of the inner dielectric layer 10 and the outer dielectric layer may be appropriately determined in accordance with the application and the like.

One internal electrode layer 12 to be alternately laminated has a lead portion 12A that is electrically connected to the inner side of a first external electrode 6 formed on the outer side of a first end portion in a Y-axis direction of the ceramic sintered body 4. In addition, the other internal electrode layer 12 has a lead portion 12B that is electrically connected to the inner side of a second external electrode 8 formed on the outer side of a second end portion in a Y-axis direction of the ceramic sintered body 4.

The interior region 13 has a capacity region 14 and lead regions 15A and 15B. The capacity region 14 is a region in which the internal electrode layer 12 is laminated along the laminating direction so as to sandwich the inner dielectric layer 10. The lead region 15A is a region located between the lead portions 12A of the internal electrode layers 12 to be connected to the external electrodes 6. The lead region 15B is a region located between the lead portions 12B of the internal electrode layers 12 to be connected to the external electrodes 8.

The conductive material contained in the internal electrode layer 12 is not particularly limited, and it is possible to use a metal such as Ni, Cu, Ag, Pd, Al, or Pt and an alloy thereof. As a Ni alloy, an alloy of Ni with one or more kinds of elements selected from Mn, Cr, Co, or Al is preferable, and the Ni content in the alloy is preferably 95 wt % or more.

Incidentally, various kinds of trace components such as P may be contained in Ni or a Ni alloy at about 0.1 wt % or less.

The internal electrode layer 12 may be formed by using a commercially available electrode paste, and the thickness of the internal electrode layer 12 may be appropriately determined in accordance with the application and the like.

Figure 2C:
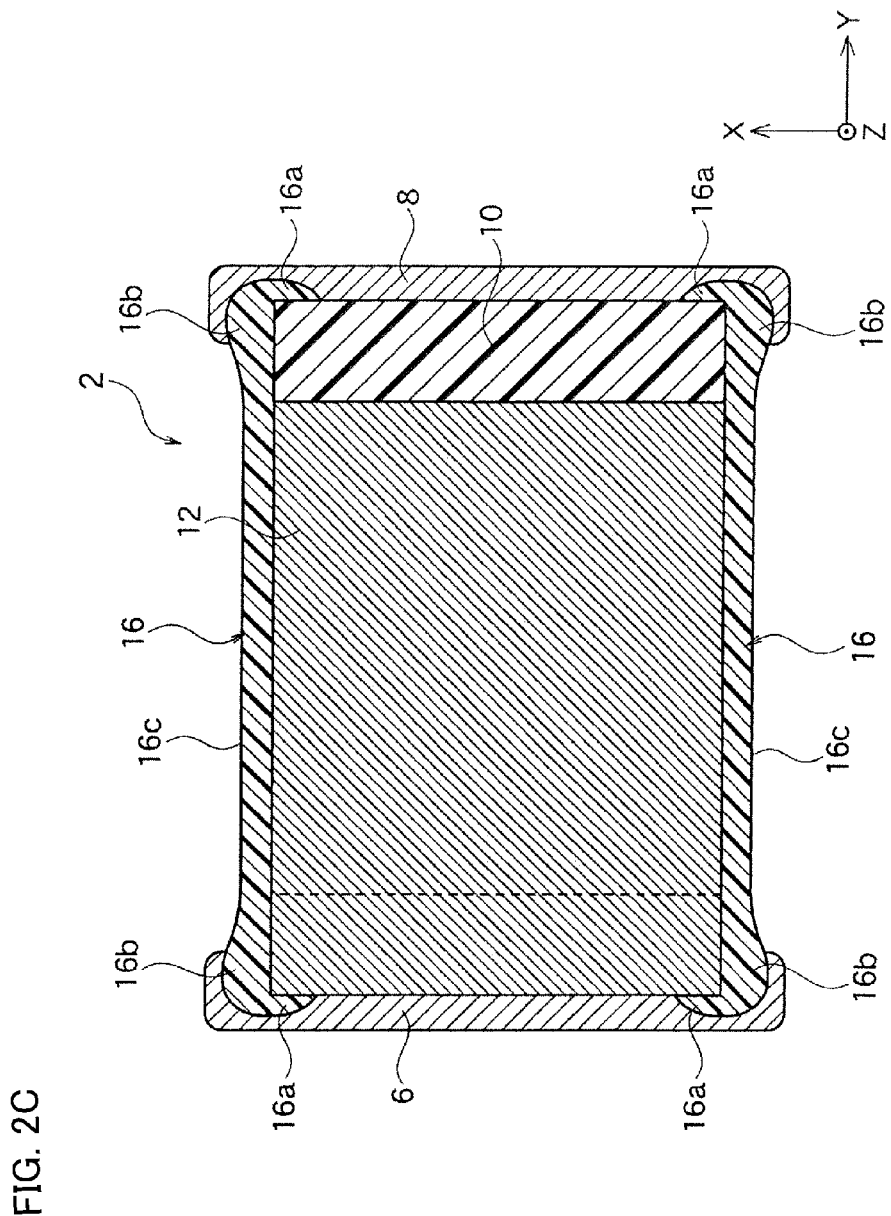
FIG. 2C is a cross-sectional view taken along the line IIB-IIB illustrated in FIG. 1.

As shown in FIG. 2A to FIG. 2C, the insulating layers 16 are formed on both end surfaces (both side surfaces) in the X-axis direction of the element body 3. The insulating layer 16 has a mountain portion 16b formed on a peripheral edge of the end surface (side surface) in the X-axis direction and a plane portion 16c of a central part.

Figure 3A:
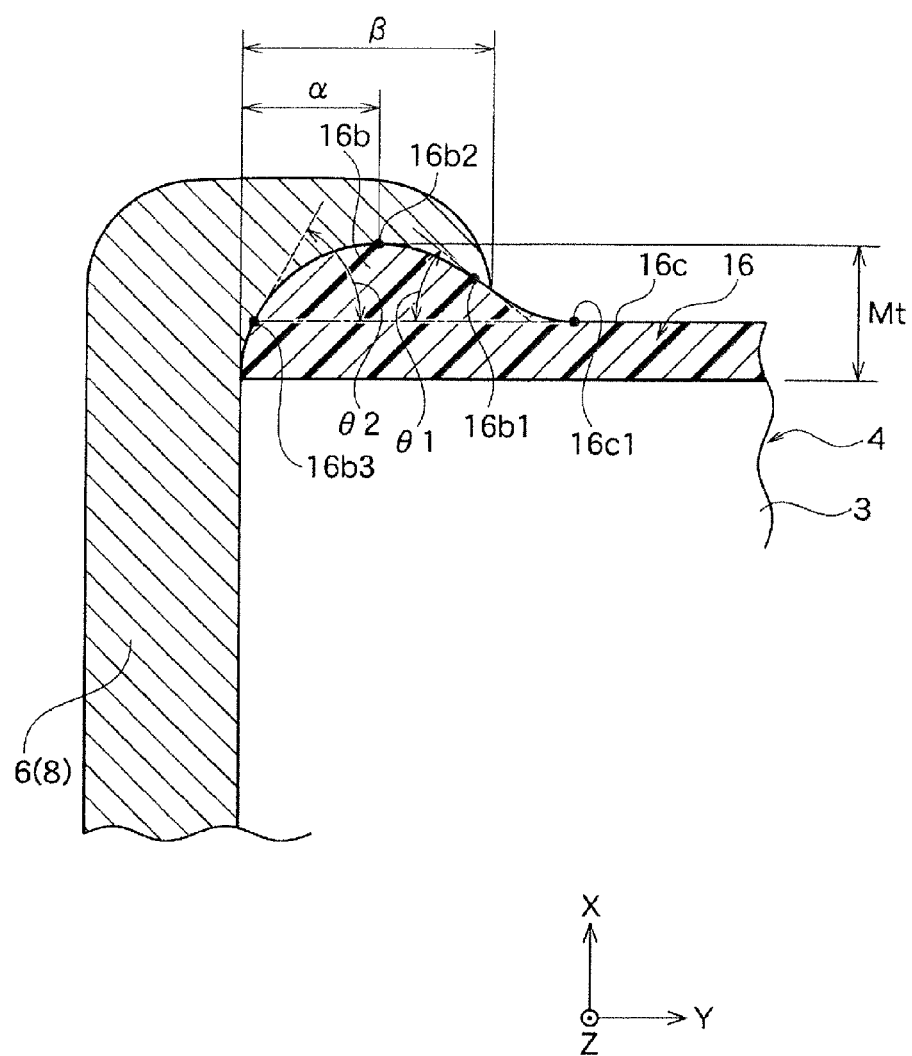
FIG. 3A is a fragmentary cross-sectional view of FIG. 2B.

Incidentally, FIG. 2B, FIG. 2C, and FIG. 3A are a cross section parallel to the plane including the X-axis and the Y-axis at the central part in the Z-axis direction of the ceramic sintered body 4, and the mountain portion 16b is formed on both sides in the Y-axis direction of the plane portion 16c. Also, as shown in FIG. 2A and FIG. 3B, the mountain portion 16b of the insulating layer 16 is formed on both sides in the Z-axis direction of the plane portion 16c on the cross section parallel to the plane including the X-axis and the Z-axis at the central part in the Y-axis direction of the ceramic sintered body 4. That is, the mountain portion 16b protruding from the plane portion 16c of the insulating layer 16 toward the X-axis direction is continuously formed on the peripheral edge of the plane portion 16c.

The constitution having the mountain portion 16b and the plane portion 16c of the insulating layer 16 according to the present embodiment can be formed by adjusting viscosity of a paste for insulating layer to be the insulating layer 16 after baking, properly selecting a method and conditions of coating steps of the paste for insulating layer mentioned below, or the like.

In the present embodiment, as shown in FIG. 2B, FIG. 2C, and FIG. 3A, both end portions in the X-axis direction of the external electrodes 6 and 8 may cover a portion (peak 16b2) having a maximum width (Mt) in the X-axis direction at the mountain portion at both end portions in the Y-axis direction of the insulating layer 16. This allows the multilayer ceramic capacitor according to the present embodiment to have a favorable fixing strength.

The insulating layer 16 of the present embodiment may not cover both end portions in the X-axis direction of the end surfaces in the Y-axis direction of the element body 3 as shown in FIG. 2B, and may integrally have insulating layer extension portions 16a covering both end portions in the X-axis direction of the end surfaces in the Y-axis direction of the element body 3 as shown in FIG. 2C.

It is preferable that the insulating layer 16 does not largely cover both end surfaces in the Y-axis direction of the element body 3 illustrated in FIG. 1, FIG. 2B, or FIG. 2C. This is because the external electrodes 6 and 8 need to be formed on both end surfaces in the Y-axis direction of the element body 3 and need to be connected to the internal electrodes 12.

The insulating layer 16 of the present embodiment, as shown in FIG. 2A, may integrally have the insulating layer extension portions 16a covering both ends in the X-axis direction of the end surfaces (main surfaces) in the Z-axis direction of the element body 3. Although not shown, the insulating layer extension portions 16a may cover the entire surfaces of the end surfaces in the Z-axis direction of the element body 3.

The external electrodes 6 and 8 of the present embodiment may be configured to cover the insulating layer extension portions 16a formed on the end surfaces in the Z-axis direction.

The softening point of the insulating layer 16 is preferably 500° C. to 1000° C. This can reduce influence of structural defect that can be generated in the preceding or following step.

The insulating layer 16 according to the present embodiment has any component, such as ceramic, aluminum, glass, titanium, and resin, but is preferably composed of glass component. In addition, the fixing strength is improved by constituting the insulating layer 16 by a glass component. It is considered that this is because a reaction phase is formed at the interface between the glass and the element body 3 and thus the adhesive properties between the glass and the element body 3 is superior to other insulating materials.

Glass exhibits higher insulating properties as compared to a ceramic. Hence, it is possible to decrease the incidence rate of short circuit even when the distance between the external electrodes 6 and 8 facing each other is decreased in a case in which the insulating layer 16 is constituted by glass component as compared to a case in which the insulating layer 16 is constituted by a ceramic. Accordingly, it is possible to decrease the incidence rate of short circuit even when the external electrodes 6 and 8 are configured to widely cover the Y-axis direction end portion of the X-axis direction end surface and the Y-axis direction end portion of the Z-axis direction end surface of the ceramic sintered body 4 in a case in which the insulating layer 16 is constituted by glass component as compared to a case in which the main component of the insulating layer 16 is a ceramic. This effect is more remarkable in a case in which the insulating layer extension portions 16a cover the entire surfaces of the end surfaces in the Z-axis direction of the element body 3.

By covering the end surface in the X-axis direction of the element body 3 with the insulating layer 16, not only the insulating properties are enhanced but also the durability and moisture resistance to the environmental impact from the outside are enhanced. Since the end surface in the X-axis direction of the fired element body 3 is covered with the insulating layer 16, the width of the side gap is small and a uniform insulating layer 16 can be formed.

The material of the external electrodes 6 and 8 is not limited either, but a well-known conductive material, such as Cu, Ag, Pd, Pt, Au, alloy thereof, and conductive resin, can be used. The thickness of the external electrodes may be appropriately determined in accordance with the application and the like.

Incidentally, in FIG. 1, the X-axis, the Y-axis, and the Z-axis are perpendicular to one another, the Z-axis coincides with the laminating direction of the inner dielectric layer 10 and the internal electrode layer 12, the Y-axis coincides with the direction in which the lead regions 15A and 15B (lead portions 12A and 12B) are formed.

In the present embodiment, as illustrated in FIG. 2A, the section from the end surface in the X-axis direction of the element body 3 to the outer surface of the insulating layer 16 along the width direction (X-axis direction) of the ceramic sintered body 4 in the insulating layer 16 is adopted as the gap portion.

In the present embodiment, the width Wgap in the X-axis direction of the gap portion coincides with the dimensions from the end surface in the X-axis direction of the element body 3 to the end surface in the X-axis direction of the insulating layer 16 along the width direction (X-axis direction) of the ceramic sintered body 4. The width Wgap preferably has an average of 0.1 μm to 40 μm, which is significantly small, compared with the width W0 of the element body 3.

By setting Wgap to be within the above range, a decrease in electrostatic capacity is small even when the ceramic sintered body 4 is more compact as well as cracking hardly occurs.

Incidentally, the width W0 of the element body 3 coincides with the width along the X-axis direction of the inner dielectric layer 10.

As shown in FIG. 2A, W1 denotes each width in the X-axis direction of the insulating layer extension portions 16a from both end surfaces in the X-axis direction of the element body 3 on the end surfaces in the Z-axis direction of the element body 3. In this case, a ratio of W1 and W0 is preferably $\frac{1}{30} \leq W1/W0$.

When W1/W0 is $\frac{1}{30}$ or more, structural defect and acoustic noise due to electrostriction can be further reduced.

W1/W0 may be ½. In this case, one of the insulating layer extension portions 16a and the other insulating layer extension portion 16a are configured to be connected. That is, the four surfaces of the main surfaces and the side surfaces of the element body 3 are covered with the insulating layer 16. In this case, an insulating layer covering the end surfaces in the X-axis direction of the element body 3 may become thin depending on coating method for the insulating layer 16, and the effect of reducing electrostriction tends to be lowered. In contrast, as mentioned above, W1/W0 of ½ more remarkably demonstrates an effect of being able to decrease the incidence rate of short circuit even when the external electrodes 6 and 8 are configured to widely cover the Y-axis direction end portion of the X-axis direction end surface and the Y-axis direction end portion of the Z-axis direction end surface of the ceramic sintered body 4 in a case in which the insulating layer is constituted by glass component.

In the present embodiment, the end portion in the X-axis direction of the internal electrode layer 12 sandwiched between the dielectric layers 10 adjacent in the laminating direction (Z-axis direction) may be recessed on the end surface in the X-axis direction of the element body 3, namely, at the predetermined retraction distance from the X-axis direction end portion to the inner side of the inner dielectric layer 10. In the present embodiment, it is possible to significantly decrease the width Wgap as compared to the prior art, moreover, the retraction distance of the internal electrode layer 12 is sufficiently small. Hence, in the present embodiment, it is possible to obtain a multilayer ceramic capacitor having a great capacity while being compact.

Incidentally, retraction of the ends in the X-axis direction of the internal electrode layers 3 can be removed by polishing, such as barrel polishing, the end surfaces in the X-axis direction of the element body 3 before forming the insulating layers 16. The retraction of the X-axis direction end portion of the internal electrode layer 12 is formed, for example, by the difference in sintering shrinkage factor between the material to form the internal electrode layer 12 and the material to form the inner dielectric layer 10.

In the present embodiment, as shown in FIG. 3A or FIG. 3B, it is preferable that θ1 is 5° to 25°, where θ1 denotes an angle made by a surface virtual line along a surface of the plane portion 16c of the insulating layer 16 and a tangential line of a curved surface at a first inner predetermined position 16b1 of the mountain portion 16b. This allows fixing strength to be favorable.

In the present embodiment, as shown in FIG. 3A or FIG. 3B, it is preferable that θ2 is 5° to 25°, where θ2 denotes an angle made by the surface virtual line and a tangential line of a curved surface at a first outer predetermined position $16b3$ of the mountain portion $16b$. This allows thermal shock resistance to be favorable.

The first inner predetermined position $16b1$ is determined by the method shown below. First, a plane end portion $16c1$, which is the outermost point of the plane portion $16c$, and a peak $16b2$ of the mountain portion $16b$ are determined. Incidentally, the peak $16b2$ is a portion having a maximum width (Mt) in the X-axis direction at the mountain portion $16b$ of both end portions in the Y-axis direction of the insulating layer 16. Y-axis direction coordinates or Z-axis direction coordinates are intermediate between the plane end portion $16c1$ and the peak $16b2$, and a point on the surface of the mountain portion $16b$ is considered to be the first inner predetermined position $16b1$.

The first outer predetermined position $16b3$ is an intersection between the surface virtual line and an outer curved surface of the mountain portion $16b$.

The first inner predetermined position $16b1$ and the first outer predetermined position $16b3$ are determined by any method, and can be determined by visual observation using a digital microscope, for example. Incidentally, a bit of error of positions of the inner predetermined position $16b1$ and the first outer predetermined position $16b3$ may occur at the time of determining them by visual observation using a digital microscope, but this influence on the magnitude of θ1 and θ2 is generally negligibly small.

Ceramic was conventionally baked on the internal electrode layers exposed from the element body. In this case, however, adhesion between ceramic and a side surface of an element body is bad, structural defects are easy to occur due to electrostriction, and external stress is hard to be reduced, thereby fixing strength is a problem The multilayer electronic component of the present embodiment is characterized by the angle θ1 made by a surface virtual line along a surface of the plane portion $16c$ of the insulating layer 16 and a tangential line of a curved surface at a first inner predetermined position $16b1$ of the mountain portion $16b$ and the angle θ2 made by the surface virtual line and a tangential line of a curved surface at a first outer predetermined position $16b3$ of the mountain portion $16b$. Setting the angles θ1 and 02 of the mountain portion $16b$ and the insulating layer 16 within a predetermined range makes it possible to strengthen adhesion between the ceramic sintered body 4 and the external electrodes 6 and 8, reduce deformation of the element body 3 due to electrostriction and external stress, and improve mountability.

The widths Wgap of both sides in the X-axis direction of the ceramic sintered body 4 may be the same as or different from each other. The widths W1 of both sides in the X-axis direction of the ceramic sintered body 4 may be the same as or different from each other.

The thickness "td" of the inner dielectric layer 10 is not particularly limited, but is preferably 0.1 μm to 5.0 μm.

The thickness "te" of the internal electrode layer 12 is not particularly limited, but is preferably 0.1 μm to 5.0 μM.

The thickness "to" of the exterior region 11 is not particularly limited, but is preferably 0.1 μm to 5.0 μm.

Method for Manufacturing Multilayer Ceramic Capacitor

Next, a method for manufacturing the multilayer ceramic capacitor 2 as an embodiment of the present invention will be specifically described. The multilayer ceramic capacitor 2 according to the present embodiment is manufactured by making green chips with an ordinary printing method, sheet method, or the like using paste, firing this, applying and baking paste for insulating layer thereto to form the insulating layer 16, and performing baking after printing or transcripting the external electrodes 6 and 8.

First, a paste for inner green sheet and a paste for outer green sheet are prepared in order to manufacture an inner green sheet $10a$ to constitute the inner dielectric layer 10 illustrated in FIG. 1 after calcination and an outer green sheet $11a$ to constitute the outer dielectric layer illustrated in FIG. 1 after calcination.

The paste for inner green sheet and the paste for outer green sheet are usually composed of an organic solvent-based paste obtained by kneading a ceramic powder with an organic vehicle or an aqueous paste.

The raw material for the ceramic powder can be appropriately selected from various kinds of compounds to be composite oxides or oxides, for example, carbonates, nitrates, hydroxides, and organic metal compounds are used by being mixed. In the present embodiment, the raw material for the ceramic powder is used as a powder having an average particle size of 0.45 μm or less and preferably about from 0.1 to 0.3 μm. Incidentally, it is desirable to use a powder finer than the thickness of the green sheet in order to obtain a significantly thin inner green sheet.

The organic vehicle is one that is obtained by dissolving a binder in an organic solvent. The binder used in the organic vehicle is not particularly limited, and it may be appropriately selected from various kinds of common binders such as ethyl cellulose and polyvinyl butyral. The organic solvent to be used is also not particularly limited, and it may be appropriately selected from various kinds of organic solvents such as an alcohol, acetone, and toluene.

In addition, the paste for green sheet may contain additives selected from various kinds of dispersants, plasticizers, dielectrics, accessory component compounds, glass frits, and insulating materials.

Examples of the plasticizer may include an ester of phthalic acid such as dibutyl phthalate, dioctyl phthalate or benzyl butyl phthalate, adipic acid, an ester of phosphoric acid, and a glycol.

Next, a paste for internal electrode layer is prepared in order to manufacture an internal electrode pattern layer $12a$ to constitute the internal electrode layers 12A and 12B illustrated in FIG. 1 after calcination. The paste for internal electrode layer is prepared by kneading a conductive material composed of various kinds of conductive metals or alloys described above with the organic vehicle described above.

When using Ni as the conductive material, Ni powder prepared by using a commercially available CVD method, wet chemical reduction method, or the like may be used.

The paste for external electrode to constitute the external electrodes 6 and 8 illustrated in FIG. 1 after calcination may be prepared in the same manner as the paste for internal electrode layer described above.

Figure 4:
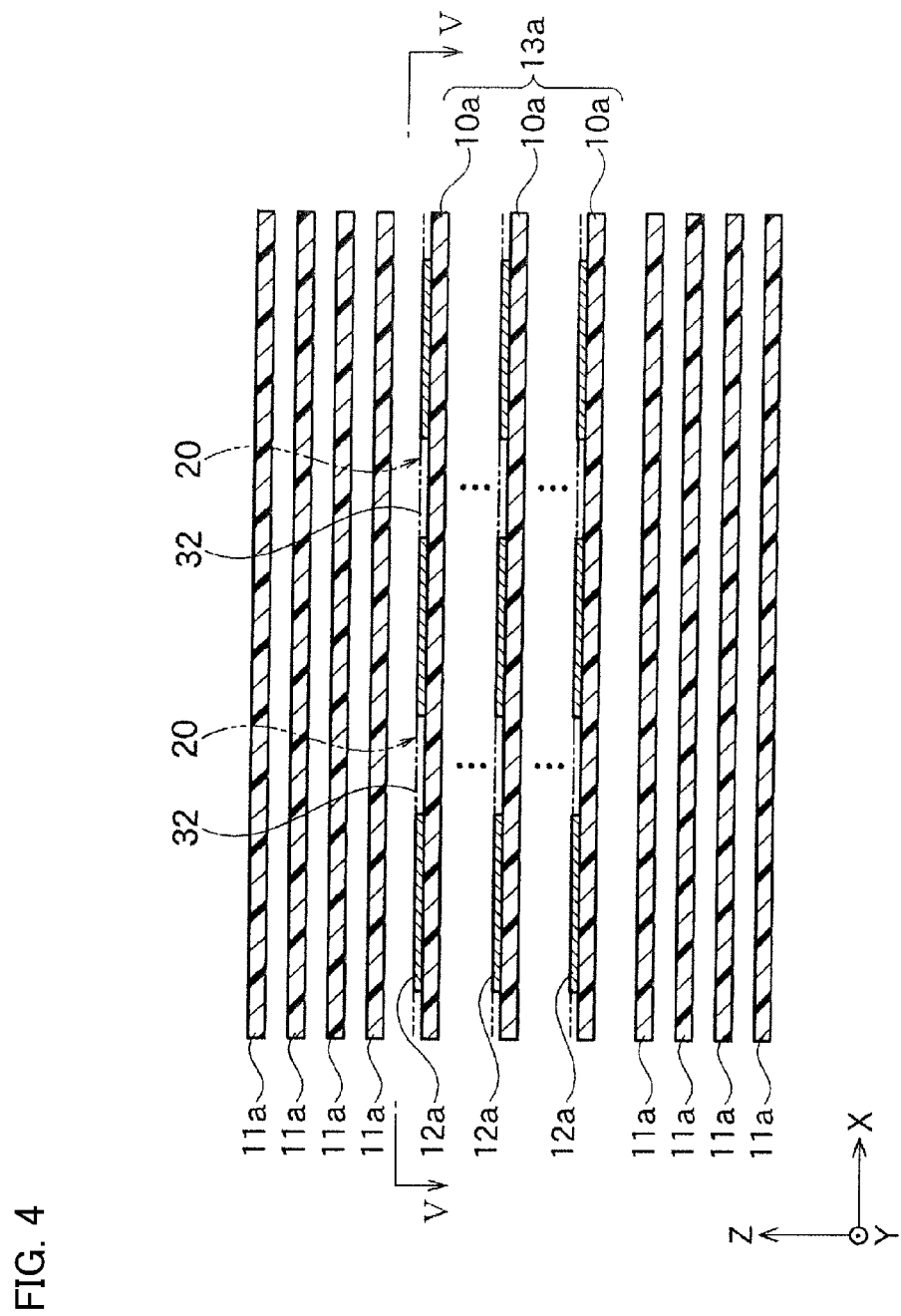
FIG. 4 is a schematic cross-sectional view illustrating the step of laminating a green sheet in the manufacturing process of a multilayer ceramic capacitor illustrated in FIG. 1.

The inner green sheet $10a$ and the internal electrode pattern layer $12a$ are alternately laminated as illustrated in FIG. 4 by using the paste for inner green sheet and the paste for internal electrode layer prepared in the above to manufacture an internal laminate $13a$. In addition, after the internal laminate $13a$ is manufactured, the outer green sheet $11a$ is formed thereon by using the paste for outer green sheet, and the resultant is pressurized in the laminating direction to obtain a green laminate.

Incidentally, the green laminate is manufactured by any method, such as printing method and sheet method. In addition to the above, a green laminate may be obtained by alternately laminating a predetermined number of the inner green sheet $10a$ and the internal electrode pattern layer $12a$ directly on the outer green sheet 11a and pressurizing the resultant in the laminating direction.

Specifically, first, the inner green sheet 10a is formed on a carrier sheet (for example, a PET film) as a support by a doctor blade method. The inner green sheet 10a is dried after being formed on the carrier sheet.

Next, as illustrated in FIG. 4, the internal electrode pattern layer 12a is formed on the surface of the inner green sheet 10a by using the paste for internal electrode layer to obtain the inner green sheet 10a having the internal electrode pattern layer 12a.

Figure 5A:
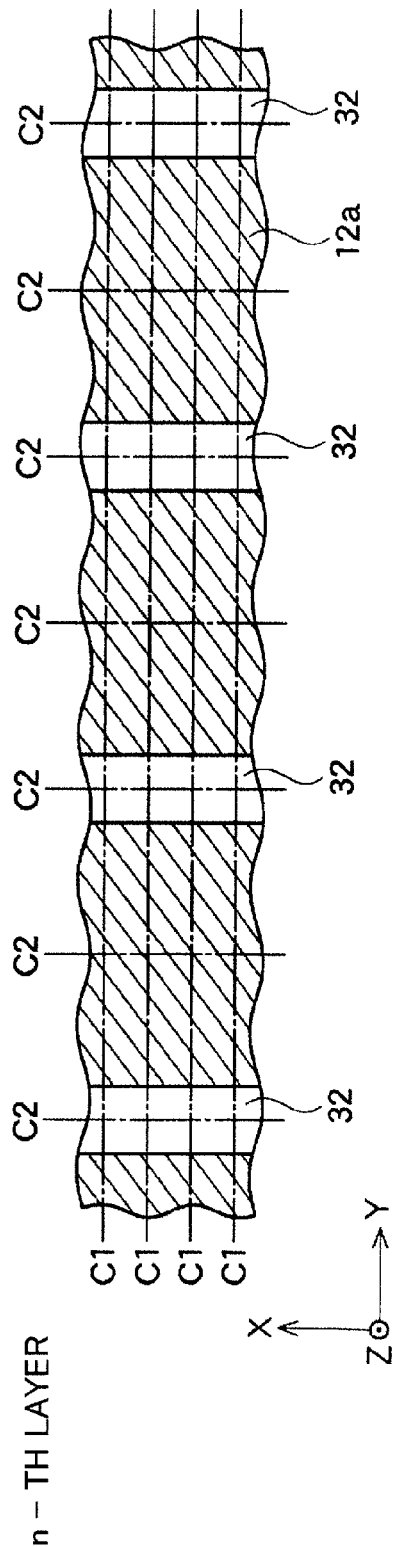
FIG. 5Aa is a plan view illustrating a portion of the n-th internal electrode pattern layer taken along the line V-V illustrated in FIG. 4.
Figure 5A:
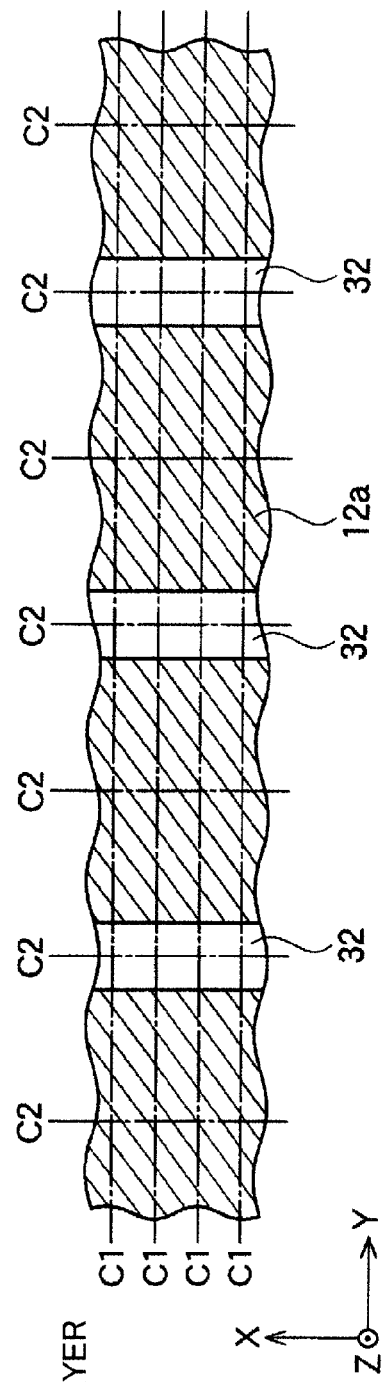

At this time, as illustrated in FIG. 5Aa, a gap 32 of the internal electrode pattern layer 12a is formed in the Y-axis direction and a continuous flat internal electrode pattern layer 12a is formed in the X-axis direction at the n-th layer.

Next, as illustrated in FIG. 5Ab, the gap 32 of the internal electrode pattern layer 12a is formed in the Y-axis direction and a continuous flat internal electrode pattern layer 12a is formed in the X-axis direction at the (n+1)-th layer as well. At this time, the gaps 32 of the internal electrode pattern layer of the n-th layer and the (n+1)-th layer are formed so as not to overlap each other in the Z axis direction of the laminating direction.

In this manner, the internal laminate 13a is manufactured by laminating a plurality of the inner green sheet 10a having the internal electrode pattern layer 12a, an appropriate number of the outer green sheets 11a is then formed above and below the internal laminate 13a by using the paste for outer green sheet, and the resultant is pressurized in the laminating direction to obtain a green laminate.

Figure 6A:
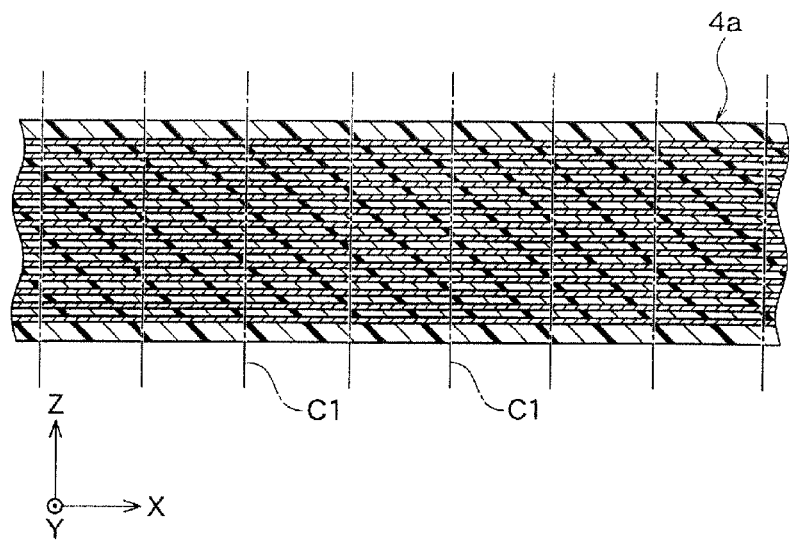
FIG. 6A is a schematic cross-sectional view of the laminate after lamination of the green sheet illustrated in FIG. 4 parallel to the X-Z-axis plane.
Figure 6B:
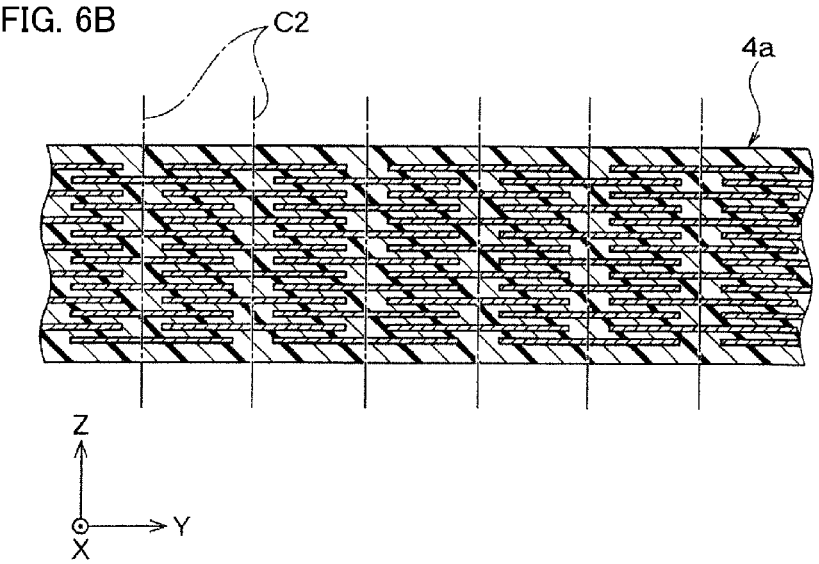
FIG. 6B is a schematic cross-sectional view of the laminate after the lamination of the green sheet illustrated in FIG. 4 parallel to the Y-Z-axis plane.

Next, the green laminate is cut along a cutting plane C1 and a cutting plane C2 in FIG. 5Aa, FIG. 5Ab, FIG. 6A, and FIG. 6B to obtain a green chip. C1 is a cutting plane parallel to the Y-Z axis plane, and C2 is a cutting plane parallel to the Z-X-axis plane.

As illustrated in FIG. 5Aa, the cutting plane C2 on the both sides of the cutting plane C2 to cut the internal electrode pattern layer 12a at the n-th layer cuts the gap 32 of the internal electrode pattern layer 12a. In addition, the cutting plane C2 which has cut the internal electrode pattern layer 12a at the n-th layer cuts the gap 32 of the internal electrode pattern layer 12a at the (n+1)-th layer.

By obtaining the green chip by such a cutting method, the n-th internal electrode pattern layer 12a of the green chip is configured to be exposed on one cutting plane and not to be exposed on the other cutting plane in the cutting plane C2 of the green chip. In addition, the (n+1)-th internal electrode pattern layer 12a of the green chip has a configuration in which the internal electrode pattern layer 12a is not exposed on the other cutting plane on which the internal electrode pattern layer 12a is exposed at the n-th layer and the internal electrode pattern layer 12a is exposed on one cutting plane on which the internal electrode pattern layer 12a is not exposed at the n-th layer on the cutting plane C2 of the green chip.

Furthermore, the internal electrode pattern layer 12a is configured to be exposed in all of the layers on the cutting plane C1 of the green chip.

In addition, the method for forming the internal electrode pattern layer 12a is not particularly limited, and it may be formed by a thin film forming method such as vapor deposition or sputtering other than a printing method and a transcription method.

In addition, a step absorbing layer 20 may be formed at the gap 32 of the internal electrode pattern layer 12a. The step on the surface of the green sheet 10a due to the internal electrode pattern layer 12a is eliminated by forming the step absorbing layer 20, and the step absorbing layer 20 finally contributes to the prevention of deformation of the ceramic sintered body 4 to be obtained.

The step absorbing layer 20 is formed by a printing method or the like in the same manner as the internal electrode pattern layer 12a, for example. The step absorbing layer 20 contains a ceramic powder and an organic vehicle which are the same as those in the green sheet 10a, but it is formed by a printing method unlike the green sheet 10a, and thus the ceramic powder and the organic vehicle are adjusted so as to be easily printed. Examples of the printing method may include screen printing and gravure printing.

The green chip is solidified by removing the plasticizer through solidification and drying. The green chip after the solidification and drying is introduced into the barrel container together with the media and the polishing liquid and subjected to barrel polishing by a horizontal centrifugal barrel machine or the like. The green chip after the barrel polishing is washed with water and dried. The green chip after drying is subjected to a binder removal step, a calcination step, and an annealing step to be conducted if necessary, whereby the element body 3 is obtained.

Known conditions may be set for the binder removal step, and for example, the retention temperature may be set to from 200° C. to 400° C.

In the present embodiment, the calcination step and the annealing step are conducted in a reducing atmosphere. Other calcination conditions or other annealing conditions may be known conditions, and for example, the retention temperature for calcination is from 1000° C. to 1300° C., and the retention temperature for annealing is from 500° C. to 1000° C.

The binder removal step, the calcination step, and the annealing step may be conducted continuously or independently.

Next, paste for insulating layer is applied by screen printing and baked on the both end surfaces in the X-axis direction of the element body 3 so as to form the insulating layer 16 and obtain the ceramic sintered body 4 illustrated in FIG. 1 and FIG. 2. With this insulating layer 16, not only the insulating properties are enhanced but also the moisture resistance is favorable. In the case of coating the paste for insulating layer, the paste may be coated not only on the both end surfaces in the X-axis direction of the element body 3 but also on the both end portions in the X-axis direction of the both end surfaces in the Z-axis direction and/or on the both end portions in the X-axis direction of the both end surfaces in the Y-axis direction of the element body 3.

When the insulating layer 16 is constituted by glass, this paste for insulating layer is obtained by kneading glass raw material, a binder whose main component is ethyl cellulose, terpineol of the dispersion medium, and the like by a mixer, for example.

The paste for insulating layer of the present embodiment preferably has a viscosity of 30 Pa·s to 120 Pa·s. This allows θ1 and θ2 to be in a favorable range, and a multilayer ceramic capacitor having favorable thermal shock resistance and fixing strength can be obtained.

A viscosity of the paste for insulating layer can be adjusted by changing an amount of terpineol of the dispersion medium or so.

A method for forming the insulating layer 16 on the element body 3 is not limited, but the following method is employed, for example.

First, the paste for insulating layer is applied on the end surface in the X-axis direction of the element body 3 by screen printing and dried. This is a coating step of the first paste for insulating layer. Thereafter, the central part in the X-axis direction of the element body 3 is masked by resin or so.

Subsequently, as a coating step of the second paste for insulating layer, the end portion in the X-axis direction of the element body 3 where the central part in the X-axis direction is masked is coated again by dipping or screen printing, dried, debindered, and baked so as to form the insulating layer 16, thereby the ceramic sintered body 4 is obtained.

The glass component of the paste for insulating layer that is liquefied at the time of baking easily penetrates into the gap from the end portion of the inner dielectric layer 10 to the end portion of the internal electrode layer 12 by the capillary action. Accordingly, the gap is reliably filled with the insulating layer 16, and thus not only the insulating properties are enhanced but also the moisture resistance is favorable.

The both end surfaces in the Y-axis direction and/or the both end surfaces in the Z-axis direction of the ceramic sintered body 4 obtained as described above may be polished, for example, by barrel polishing, sandblasting, or the like if necessary.

Next, the paste for external electrode is coated and baked on the both end surfaces in the Y-axis direction of the ceramic sintered body on which the insulating layer 16 is baked to form the external electrodes 6 and 8. The formation of the external electrodes 6 and 8 may be conducted after the formation of the insulating layer 16 or may be simultaneously conducted with the formation of the insulating layer 16, but preferably it is conducted after the formation of the insulating layer 16.

The method for forming the external electrodes 6 and 8 is not particularly limited, and it is possible to use an appropriate method such as coating and baking of the paste for external electrode, dipping and baking, plating, vapor deposition, or sputtering.

If necessary, a covering layer is formed on the four surfaces of the external electrodes 6 and 8 by plating or so.

The multilayer ceramic capacitor 2 of the present embodiment thus manufactured is mounted on a printed circuit board by soldering or the like and used in various kinds of electronic devices.

In the prior art, a portion of the dielectric layer is adopted as a gap portion, and thus a blank pattern in which the internal electrode pattern layer is not formed is formed at the portion to be the gap portion after calcination of the surface of the green sheet at a predetermined interval along the X-axis direction.

In contrast, in the present embodiment, the internal electrode pattern layer is continuously formed along the X-axis direction, and the gap portion is obtained by forming an insulating layer on the element body. Hence, a blank pattern for forming the gap portion is not formed. Accordingly, a flat film of the internal electrode pattern layer is forming on the green sheet unlike the method of the prior art. Hence, the number of acquisition of the green chip per area of the green sheet can be increased as compared to the prior art.

In addition, in the present embodiment, the green laminate is cut without having to worry about the blank pattern unlike the prior art, and thus the yield of cutting is improved as compared to that in the prior art.

Furthermore, there is a problem in the prior art that the thickness of the blank pattern portion is thinner as compared to the portion at which the internal electrode pattern layer is formed when the green sheet is laminated and thus the green chip is curved in the vicinity of the cutting plane thereof when the green laminate is cut. In addition, in the prior art, a bump is formed near the blank pattern portion of the internal electrode pattern layer, and thus irregularities is caused on the internal electrode layer and it is concerned that the internal electrode or green sheet is deformed as these are laminated. In contrast, in the present embodiment, the blank pattern is not formed and the bump of the internal electrode pattern layer is also not formed.

Furthermore, in the present embodiment, the internal electrode pattern layer is a flat film, a bump of the internal electrode pattern layer is not formed, and bleeding or blurring of the internal electrode pattern layer is not caused in the vicinity of the gap portion, and thus it is possible to improve the acquisition capacity. This effect is more remarkable as the element body is smaller.

Second Embodiment

The present embodiment is the same as First Embodiment except that the external electrodes 6 and 8 must cover a portion having the maximum width in the X-axis direction at the mountain portion 16*b* of the end portion in the Y-axis direction of the insulating layer 16, and overlapping explanation is omitted.

In the present embodiment, as shown in FIG. 2B, FIG. 2C, or FIG. 3A, both end portions in the X-axis direction of the external electrodes 6 and 8 cover a portion (peak 16*b*2) having a maximum width (Mt) in the X-axis direction at the mountain portion of both end portions in the Y-axis direction of the insulating layer 16. This allows the multilayer ceramic capacitor according to the present embodiment to have a favorable fixing strength.

As shown in FIG. 3A, a denotes a length along the Y-axis direction from an end portion in the Y-axis direction of the element body 3 to the portion having the maximum width in the X-axis direction at the mountain portion of the end portion in the Y-axis direction of the insulating layer 16, and β is a covering length along the Y-axis direction of the external electrodes 6 and 8 covering the insulating layer 16 from the end portion in the Y-axis direction of the element body 3.

In the present embodiment, $1/30 \leq \alpha/\beta < 1$ is preferably satisfied.

When $1/30 \leq \alpha/\beta < 1$ is satisfied, compared with when $\alpha/\beta$ is less than $1/30$, a covering length of the external electrodes 6 and 8 is shorter, and an incidence rate of short circuit due to extension of plating covering the external electrodes 6 and 8 can be lower.

When $1/30 \leq \alpha/\beta < 1$ is satisfied, compared with when $\alpha/\beta$ is one or more, a covering length of the external electrodes 6 and 8 is longer, and a fixing strength can be favorable.

Mt/β is preferably $1/30$ to $1/10$, where Mt denotes a maximum length from the end portion in the X-axis direction of the element body 3 to the end portion in the X-axis direction of the insulating layer 16. This allows thermal shock resistance and fixing strength to be favorable.

Third Embodiment

Figure 2D:
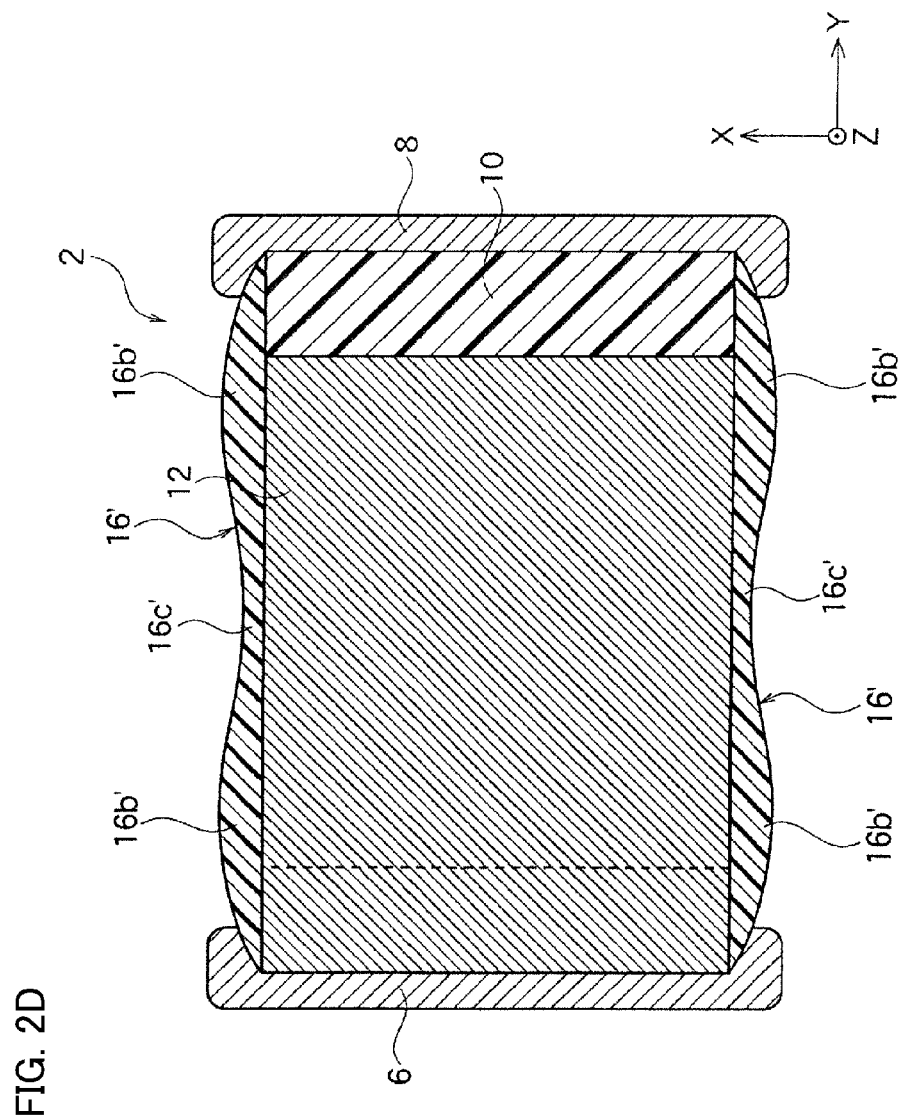
FIG. 2D is a cross-sectional view taken along the line IIB-IIB illustrated in FIG. 1.
Figure 3C:
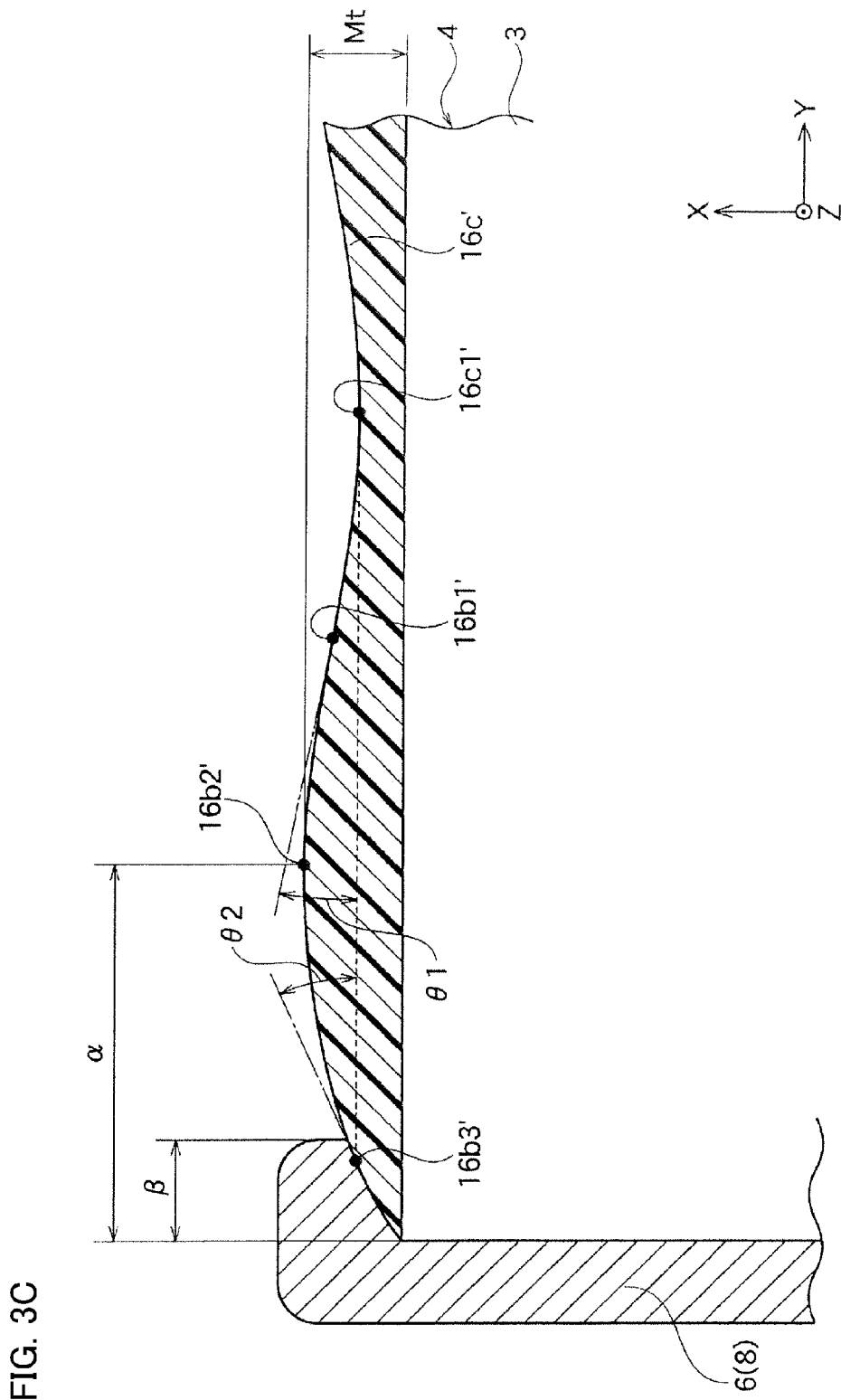
FIG. 3C is a fragmentary cross-sectional view of FIG. 2D.

The present embodiment is the same as First Embodiment except that, as shown in FIG. 2D, FIG. 2E, and FIG. 3C, an insulating layer 16' consists of mountain portions 16*b*' and valley portions 16*c*', which are formed on a peripheral edge of the end surface (side surface) in the X-axis direction, and that no plane portions 16*c* are observed, and overlapping explanation is omitted.

In the present embodiment, as shown in FIG. 3C, θ1' is 5° to 25°, where θ1' denotes an angle made by a virtual line passing through a mountain portion minimum point 16c1' of the mountain portion 16c' of the insulating layer 16' and drawn toward a vertical direction to the X-axis direction and a tangential line of a curved surface at a second inner predetermined position 16b1' of the mountain portion 16b'. This allows a fixing strength to be favorable. Incidentally, the mountain portion minimum point 16c1' is a portion of the mountain portion 16c' having a minimum width in the X-axis direction at the central part in the Y-axis direction of the insulating layer 16.

In the present embodiment, as shown in FIG. 3C, θ2' is 5° to 25°, where θ2' denotes an angle made by a vertical virtual line passing through the mountain portion minimum point 16c1' and drawn toward the vertical direction to the X-axis direction and a tangential line of a curved surface at a second outer predetermined position 16b3' of the mountain portion 16b'. This allows thermal shock resistance to be favorable.

The second inner predetermined position 16b1' in a case shown in FIG. 3C is determined by the following method. First, the mountain portion minimum point 16c1' and a peak 16b2' of the mountain portion 16b' are determined. The second inner predetermined position 16b1' denotes a point on the surface of the mountain portion 16b' or the valley portion 16c' where a coordinate in the Y-axis direction is intermediate between the mountain portion minimum point 16c1' and the peak 16b2'. Incidentally, in the present embodiment, a boundary between the mountain portion 16b' and the valley portion 16c' is not necessarily clear.

The second outer predetermined position 16b3' is an intersection between the vertical virtual line and the outer curved surface of the mountain portion 16b'.

The multilayer electronic component of the present embodiment is characterized by the angle θ1' made by the vertical virtual line and the tangential line of the curved surface at the second inner predetermined position 16b1' and the angle θ2' made by the vertical virtual line and the tangential line of the curved surface at the second outer predetermined position 16b3' of the mountain portion 16b'. Setting the angles θ1' and θ2' of the mountain portion 16b' or the valley portion 16c' of the insulating layer 16' within a predetermined range makes it possible to strengthen adhesion between the ceramic sintered body 4 and the external electrodes 6 and 8, reduce deformation of the element body 3 due to electrostriction, and improve mountability.

The embodiments of the present invention have been described, but the present invention is not limited to the embodiments described above in any way and may be variously modified within the scope of the present invention. For example, the present invention may simultaneously have features of a plurality of the embodiments of First Embodiment to Third Embodiment.

Figure 2F:
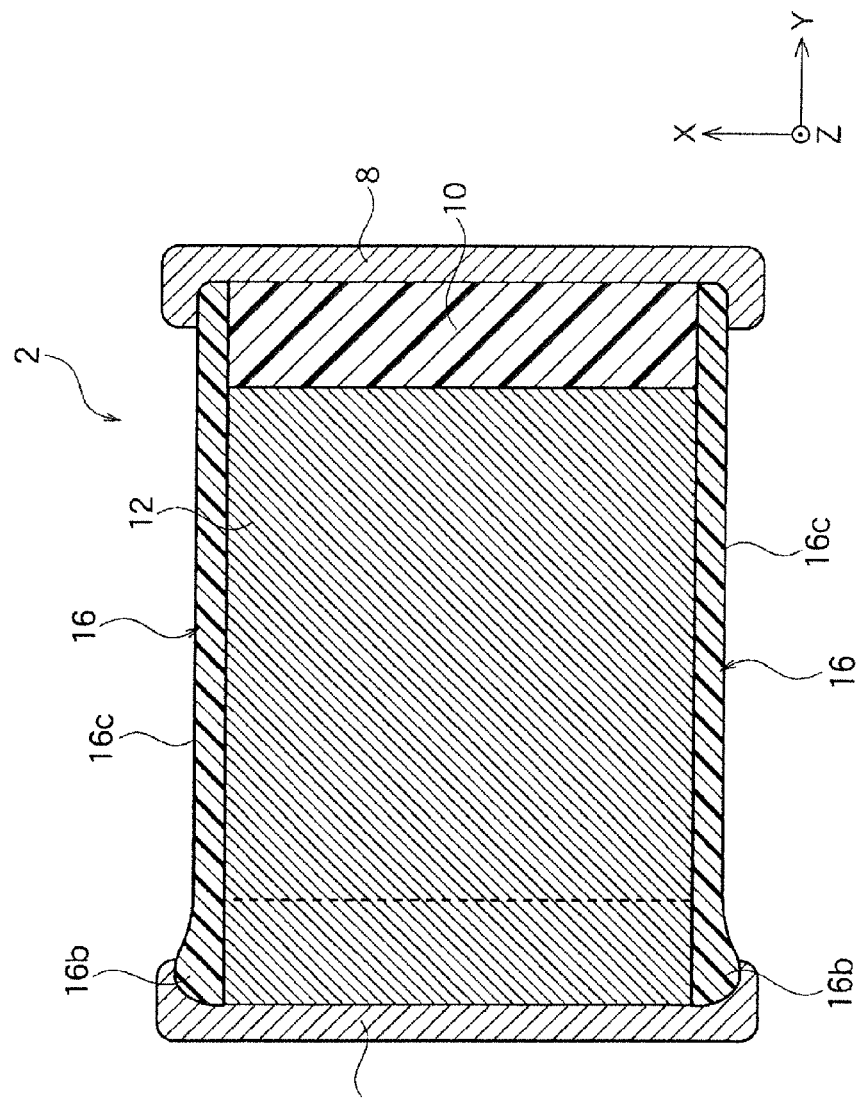
FIG. 2F is a cross-sectional view taken along the line IIB-IIB illustrated in FIG. 1.
Figure 2G:
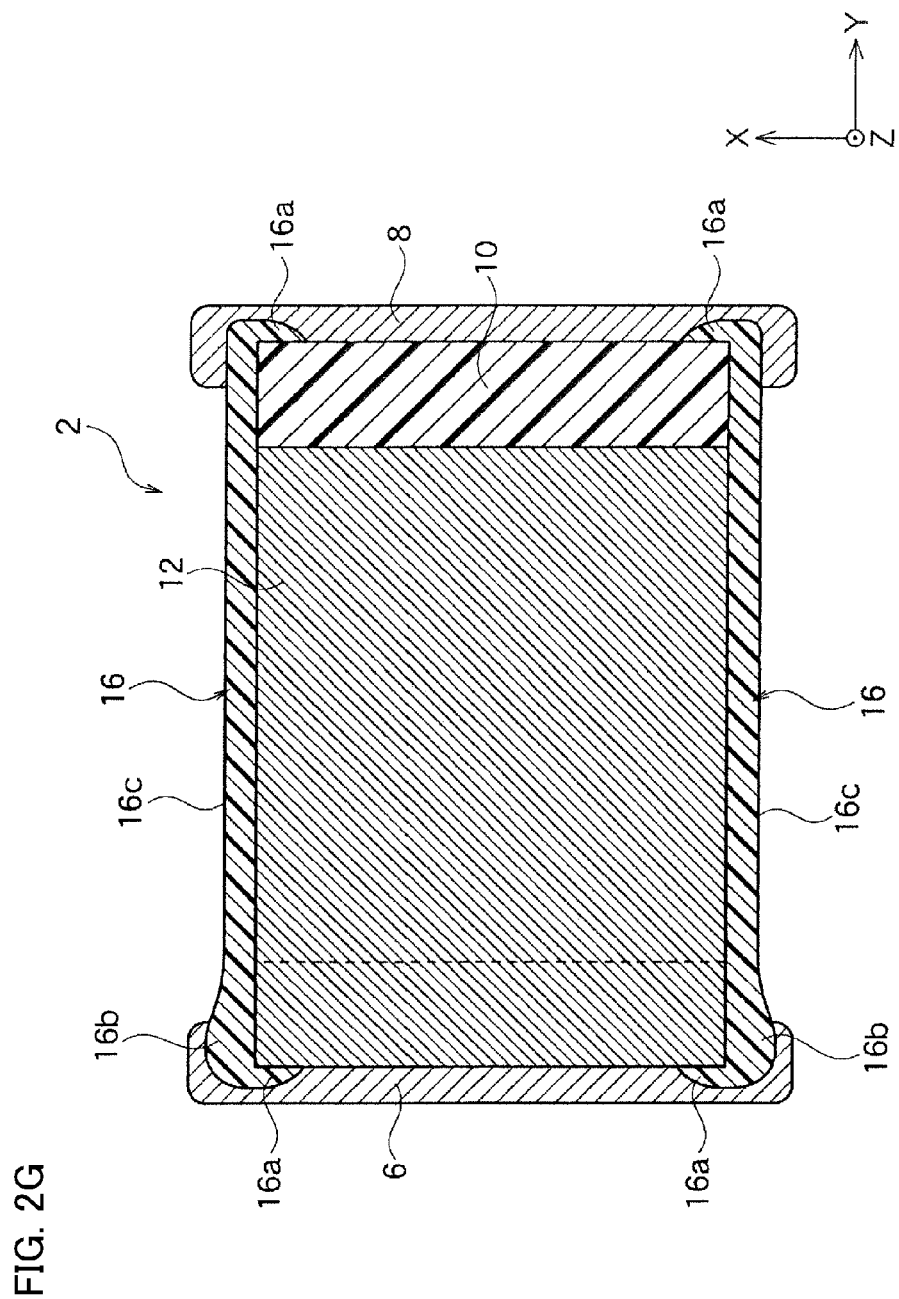
FIG. 2G is a cross-sectional view taken along the line IIB-IIB illustrated in FIG. 1.

It is common among all of the embodiments that the insulating layer has the mountain portion formed on the peripheral edge of the side surface, but the mountain portion does not need to be formed on the whole periphery of the side surface. For example, as shown in FIG. 2F and FIG. 2G, the mountain portion may be formed on only part of the side surface.

In First Embodiment and Second Embodiment, the plane portions 16c do not necessarily need to be vertical to the X-axis direction and may be tilted. When the plane portion 16c is tiled, the surface virtual line is also tiled.

Furthermore, not all of the cutting planes need to have θ1 and θ2 being within a predetermined range in First Embodiment and Second Embodiment, and not all of the cross sections need to have θ1' and θ2' being within a predetermined range in Third Embodiment. For example, in Third Embodiment, FIG. 2D and FIG. 3C are obtained by cutting the ceramic sintered body 4 at the central part in the Z-axis direction of FIG. 1, but one or more of θ1' and θ2' may be out of a specified range, or two mountain portions may not be formed at the time of cutting the ceramic sintered body 4 at another point other than the central part in the Z-axis direction.

Figure 5B:
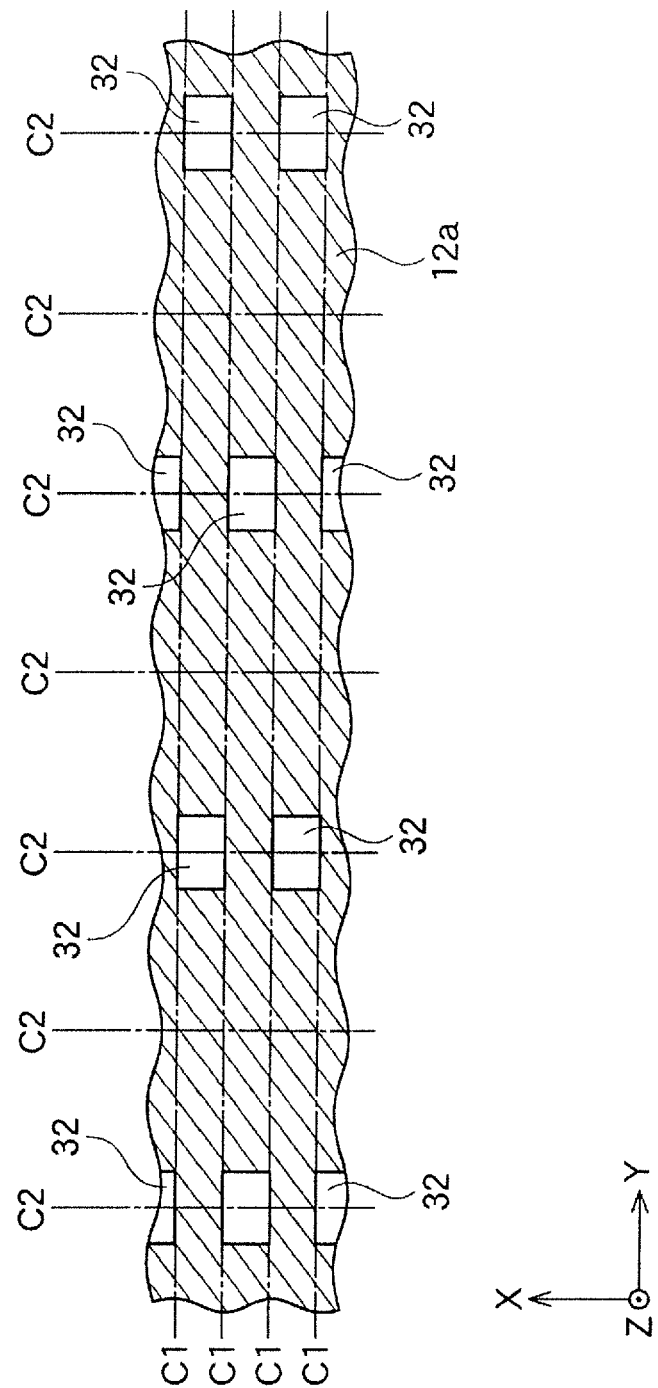
FIG. 5B is a plan view illustrating a portion of the internal electrode pattern layer taken along the line V-V illustrated in FIG. 4.

In addition to the patterns illustrated in FIG. 5Aa and FIG. 5Ab, the internal electrode pattern layer 12a may be a pattern having the gap 32 of the grid-like internal electrode pattern layer 12a as illustrated in FIG. 5B, for example.

Incidentally, a method for controlling a/β within a predetermined range as Second Embodiment is not particularly limited, and this control can be made by changing a thickness of dipping and printing of paste, for example. An embodiment like Third Embodiment having no plane portions may be obtained by thinly changing a thickness of dipping and printing of the second paste for insulating layer. An embodiment having the mountain portion only on one side as shown in FIG. 2F and FIG. 2G may be obtained by changing cut surface of cross section, tilting the chip, or tilting dipping and printing of the second paste for insulating layer. An embodiment having tilted plane portion may be obtained by changing cut surface of cross section, tilting the chip, or tilting dipping and printing of the second paste for insulating layer.

In addition, the multilayer electronic component of the present invention is not limited to a multilayer ceramic capacitor, but it can be applied to other multilayer electronic components. Other multilayer electronic components are all of the electronic parts in which the dielectric layer is laminated via an internal electrode, and examples thereof may include a bandpass filter, a chip inductor, a laminated three-terminal filter, a piezoelectric element, a chip thermistor, a chip varistor, a chip resistor, and other surface mounted (SMD) chip type electronic parts.

EXAMPLES

Hereinafter, the present invention will be described based on further detailed Examples, but the present invention is not limited to these Examples.

Example 1

The capacitor samples of sample No. 1 to sample No. 7 were fabricated as follows to measure θ1 and θ2 and evaluate thermal shock resistance and fixing strength.

First, a $BaTiO_3$-based ceramic powder: 100 parts by weight, a polyvinyl butyral resin: 10 parts by weight, dioctyl phthalate (DOP) as a plasticizer: 5 parts by weight, an alcohol as a solvent: 100 parts by weight were mixed and pasted by a ball mill, thereby obtaining a paste for inner green sheet.

In addition, apart from to the above, Ni particles: 44.6 parts by weight, terpineol: 52 parts by weight, ethyl cellulose: 3 parts by weight, and benzotriazole: 0.4 parts by weight were kneaded and formed into to a slurry by a triple roll, thereby preparing a paste for internal electrode layer.

The inner green sheet 10a was formed on a PET film by using the paste for inner green sheet prepared in the above so as to have a thickness after drying of 7 μm. Subsequently, the internal electrode pattern layer 12a was printed thereon in a predetermined pattern by using the paste for internal electrode layer, and the sheet was peeled off from the PET film. Then, the inner green sheet 10a having the internal electrode pattern layer 12a was obtained.

As illustrated in FIG. 4, the internal laminate 13a was manufactured by laminating the inner green sheet 10a having the internal electrode pattern layer 12a, an appropriate number of the outer green sheets 11a was then formed above and below the internal laminate 13a by using the paste for outer green sheet, and the resultant was pressurized and bonded in the laminating direction, thereby obtaining a green laminate. The paste for outer green sheet was obtained by the same method as the paste for inner green sheet.

Next, the green laminate was cut along the cutting plane C1 and the cutting plane C2 to obtain a green chip as illustrated in FIG. 5Aa, FIG. 5Ab, FIG. 6A, and FIG. 6B.

Next, the green chip thus obtained was subjected to the binder removal treatment, the calcination, and the annealing under the following conditions, thereby obtaining the element body 3.

The condition for binder removal treatment was set so as to have a rate of temperature rise: 60° C./hour, a retention temperature: 260° C., a temperature retention time: 8 hours, and an atmosphere: in the air.

The condition for calcination was set so as to have a rate of temperature rise: 200° C./hour, a retention temperature: from 1000° C. to 1200° C., a temperature retention time: 2 hours, and a cooling speed: 200° C./hour. Incidentally, the atmosphere gas was a humidified $N_2+H_2$ mixed gas.

The condition for annealing was set so as to have a rate of temperature rise: 200° C./hour, a retention temperature: from 500° C. to 1000° C., a temperature retention time: 2 hours, a cooling speed: 200° C./hour, and an atmosphere gas: humidified $N_2$ gas.

Incidentally, a wetter was used for the humidification of the atmosphere gas at the time of calcination and annealing.

Subsequently, BaO: 14.4 parts by weight, ZnO: 12.0 parts by weight, $B_2O_3$: 11.6 parts by weight, CaO: 3.6 parts by weight, and $SiO_2$: 3.0 parts by weight, terpineol: 5.0 to 60.0 parts by weight, ethyl cellulose: 3 parts by weight, and benzotriazole: 0.4 parts by weight were kneaded and formed into to a slurry by a triple roll, thereby preparing a paste for insulating layer having viscosity shown in Table 1. The insulating layer obtained by the paste for insulating layer of the present Example had a softening point of 655° C.

The viscosity of the paste for insulating layer was changed by changing an amount of terpineol per sample of sample No. 1 to sample No. 7.

The viscosity of the paste for insulating layer was measured using a rheometer (RVDV-II+P CP made by BROOKFIELD). Incidentally, the viscosity at 25° C. and a shear rate of 10 sec$^{-1}$ was measured.

The paste for insulating layer was coated on the end surface in the X-axis direction of the element body 3 by screen printing so as to have a film thickness of 20 Jim (coating step of first paste for insulating layer).

Next, after drying it at 180° C., printing acrylic resin on the surface of the insulating layer, and masking it, a screen printing was performed with a film thickness shown in Table 1 using a paste for insulating layer that was the same as the paste for insulating layer used in the coating step of the first paste for insulating layer (coating step of second paste for insulating layer). The chip obtained was dried at 180° C. and was subjected to the binder removal treatment and baking using a belt conveyor furnace to form the insulating layer 16 on the element body 3, thereby obtaining the ceramic sintered body 4. The conditions for binder removal treatment and baking were as follows.

Binder removal treatment
Rate of temperature rise: 1000° C./hour
Retention temperature: 500° C.
Temperature retention time: 0.25 hour
Atmosphere: in the air
Baking
Rate of temperature rise: 700° C./hour
Retention temperature: from 700° C. to 1000° C.
Temperature retention time: 0.5 hour
Atmosphere: humidified $N_2$ gas The end surface in the Y-axis direction of the ceramic sintered body 4 thus obtained was polished by barrel treatment.

Next, 100 parts by weight of a mixture of spherical Cu particles having an average particle size of 0.4 μm and a flaky Cu powder, 30 parts by weight of an organic vehicle (one prepared by dissolving 5 parts by weight of an ethyl cellulose resin in 95 parts by weight of butyl carbitol), and 6 parts by weight of butyl carbitol were kneaded to obtain a pasted paste for external electrode.

The obtained paste for external electrode was transcripted on the end surface in the Y-axis direction of the ceramic sintered body 4 by dipping with a film thickness of 10 to 15 μm and calcinated for 10 minutes at 850° C. in $N_2$ atmosphere to form the external electrodes 6 and 8. A coating layer was formed on the external electrodes 6 and 8 by plating. Then, the multilayer ceramic capacitor 2 was obtained.

The capacitor sample (multilayer ceramic capacitor 2) manufactured in this way had a size of 3.2×2.5×1.5 mm, and the inner dielectric layer 10 was 10-layered. Incidentally, the inner dielectric layer 10 had a thickness of 5.0 μm, and the internal electrode layer 12 had a thickness of about 1.2 μm.

The capacitor sample thus obtained was measured or evaluated by the following methods.

<θ1 and θ2>

The resin embedding was conducted so that the capacitor sample stood facing down the end surface in the Z-axis direction, and the other end surface was polished along the Z-axis direction of the multilayer ceramic capacitor 2, thereby obtaining a polished cross section having the length of the Z-axis direction of the element body 3 of ½H0. Next, this polished cross section was subjected to ion milling to remove the undercut caused by polishing. A cross section for observation was obtained in this manner.

Next, θ1 and θ2 shown in FIG. 3A were measured on the cross section for observation. Specifically, the angles were calculated by trigonometric ratio. θ1 and θ2 were measured at four places of corners of the insulating layers 16 per one sample. This operation was performed for 30 capacitor samples to calculate each average of θ1 and θ2 of 120 places in total. This result is shown in Table 2. Incidentally, portions where the insulating layer was defected were not counted.

Incidentally, for measuring the widths, a digital microscope (VHX microscope by KEYENCE CORPORATION) was used, and observation and measurement were performed by a 5000 magnification lens. The first inner predetermined position and the first outer predetermined position were specified by visual observation.

<Thermal Shock Resistance>

100 capacitor samples were immersed into molten solder of 250° C. at a rate of 10 cm/sec and pulled up at 10 cm/sec in 10 seconds. After this operation was repeated 10 times, insulation resistance was measured to inspect short circuit defective rate. The result is shown in Table 2. A short circuit defective rate of 0% at 250° C. was determined as being favorable.

<Fixing Strength>

Figure 7:
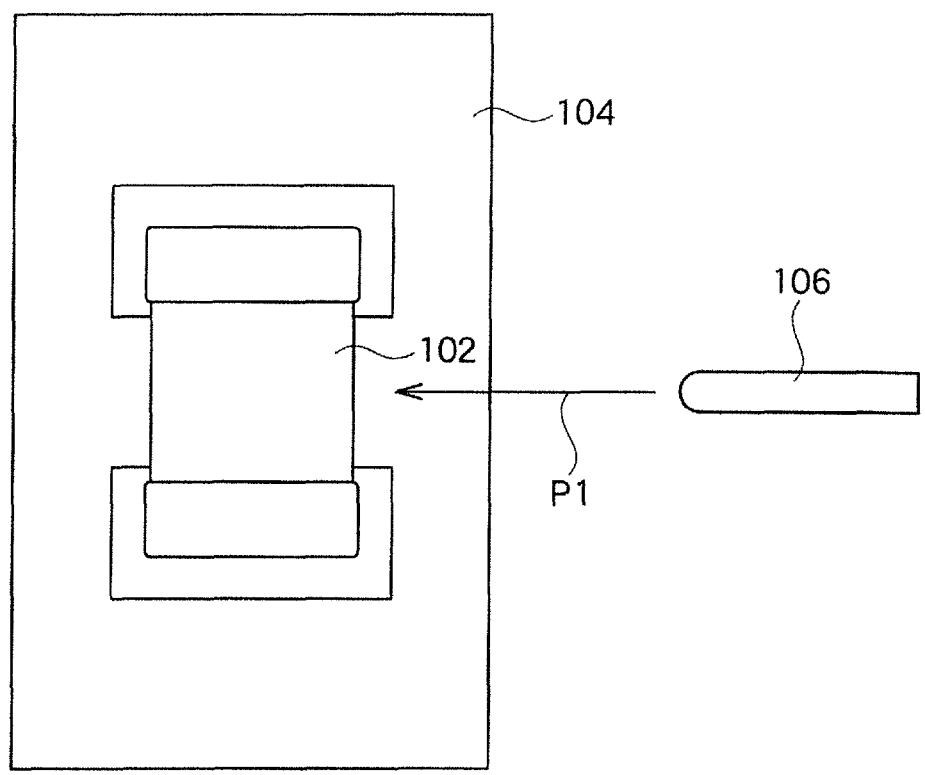
FIG. 7 is a schematic view for explaining a method for measuring fixing strength of the present Example.

As illustrated in FIG. 7, a cemented carbide pressurizing jig 106 was directed toward the end surface in the X-axis direction of the capacitor sample 102 at a rate of 30 mm/min in a state in which the capacitor sample 102 was mounted on the circuit board 104, and the capacitor sample 102 was pressurized by the pressurizing jig 106 from the direction of an arrow P1. In this time, fixing strength was evaluated by whether the capacitor sample 102 was broken due to a load of 10N. The test was performed for 100 capacitor samples to calculate capacitor defective rates. The result is shown in Table 2. As the evaluation standard, being less than 5% was considered to be more favorable, and being 5% to 15% was considered to be favorable. Incidentally, the inner structure of the capacitor sample 102 according to the present embodiment was the same as that of the multilayer ceramic capacitor 2 shown in FIG. 1 and FIG. 2.

TABLE 1

| Example 1 Sample number | Viscosity (Pa · s) | Pringing film thickness of coating step of second paste for insulating layer (μm) |
|---|---|---|
| 1 | 42 | 10.0 |
| 2 | 42 | 20.0 |
| 3 | 57 | 10.0 |
| 4 | 82 | 10.0 |
| 5 | 82 | 20.0 |
| 6 | 103 | 10.0 |
| 7 | 103 | 20.0 |

TABLE 2

| Example 1 Sample number | θ1 | θ2 | Thermal shock resistance | Fixing strength |
|---|---|---|---|---|
| 1 | 2.0 | 4.0 | ○ : 0% | X : 20% |
| 2 | 5.0 | 5.0 | ○ : 0% | ○ : 7% |
| 3 | 10.0 | 9.0 | ○ : 0% | ○ : 7% |
| 4 | 19.5 | 19.0 | ○ : 0% | ○ : 7% |
| 5 | 24.5 | 23.5 | ○ : 0% | ○ : 7% |
| 6 | 30.0 | 32.0 | X : 10% | ○ : 7% |
| 7 | 35.0 | 39.0 | X : 9% | ○ : 9% |

It was confirmed that fixing strength was favorable when θ1 was more than 2.0° and less than 30.0° and θ2 was more than 4.0° and less than 32.0° (sample No. 2 to sample No. 5), compared with when θ1 was 2.0° (sample No. 1).

It is considered that the fixing strength of sample No. 1 was defective because the mountain portion of the insulating layer had a thin shape, and its portion was thus not able to stand external stress.

It was confirmed that thermal shock resistance was favorable when θ1 was more than 2.0° and less than 30.0° and θ2 was more than 4.0° and less than 32.0° (sample No. 2 to sample No. 5), compared with when θ2 was more than 32.0° (sample No. 6 and sample No. 7).

As for sample No. 6 and sample No. 7, the mountain portion of the insulating layer protrudes largely, and the external electrodes are hard to cover the gap portion of the insulating layer. It is thus considered that sample No. 6 and sample No. 7 were not able to stand thermal shock, and cracks were generated.

Example 2

The capacitor samples of sample No. 8 to sample No. 17 were fabricated in the same manner as sample No. 4 of Example 1, except that a printing film thickness of the coating step of the second paste for insulating layer was 10 μm, and that the dipping film thickness at the time of transcripting the paste for external electrode on the end surface in the Y-axis direction of the ceramic sintered body 4 by dipping was changed to ones described in Table 3. Then, α/β was measured, and thermal shock resistance, fixing strength, and incidence rate of short circuit were evaluated. The result is shown in Table 3.

Incidentally, the paste for insulating layer used for sample No. 8 to sample No. 17 had a composition of BaO: 14.4 parts by weight, ZnO: 12.0 parts by weight, $B_2O_3$: 11.6 parts by weight, CaO: 3.6 parts by weight, $SiO_2$: 3.0 parts by weight, terpineol: 52 parts by weight, ethyl cellulose: 3 parts by weight, and benzotriazole: 0.4 parts by weight.

The thermal shock resistance and fixing strength of sample No. 8 to sample No. 17 were evaluated in the same manner as Example 1. The method for measuring α/β and the method for evaluating incidence rate of short circuit were as follows. Incidentally, θ1 of sample No. 8 to sample No. 17 was 24.5°, and θ2 of sample No. 8 to sample No. 17 was 23.5°.

<α/β>

The capacitor samples were prepared, and the cross section for observation was obtained in the same manner as the measurement of θ1 and θ2.

Next, α and β shown in FIG. 3A were measured on the cross section for observation α and β were measured at four places of corners of the insulating layers 16 per one sample. This operation was performed for 30 capacitor samples. Each of α and β was measured at 120 places in total to obtain averages of α and β and calculate α/β. This result is shown in Table 3. Incidentally, portions where the insulating layer was defected were not counted. All of the samples of sample No. 8 to sample No. 17 had an average of a of 6 μm.

Incidentally, for measuring α and β, a digital microscope (VHX microscope by KEYENCE CORPORATION) was used, and observation and measurement were performed by a 5000 magnification lens.

<Short Circuit Defective Rate>

The resistance values of each capacitor sample were measured by an insulation resistance meter (E2377A by Hewlett-Packard Company), and a sample whose resistance value was 100 kΩ or less was determined as a short circuit defective sample. The above measurement was performed to 100 capacitor samples, and a ratio of samples with short circuit defects was determined as a short circuit defective rate. A short circuit defective rate of 15% or less was favorable.

TABLE 3

| Example 2 Sample number | Dipping film thickness of paste for external electrode (μm) | α/β | Thermal shock resistance | Fixing strength | Short circuit rate |
|---|---|---|---|---|---|
| 8 | 300 | 1/50 | ○ : 0% | ◎ : 0% | X : 50% |
| 9 | 250 | 1/40 | ○ : 0% | ◎ : 3% | X : 30% |
| 10 | 200 | 1/30 | ○ : 0% | ◎ : 3% | ○ : 14% |
| 11 | 100 | 1/20 | ○ : 0% | ◎ : 3% | ○ : 10% |
| 12 | 50 | 1/10 | ○ : 0% | ◎ : 3% | ○ : 8% |
| 13 | 20 | 1/3 | ○ : 0% | ◎ : 3% | ○ : 7% |
| 14 | 15 | 1/2 | ○ : 0% | ◎ : 2% | ○ : 5% |

TABLE 3-continued

| Example 2 Sample number | Dipping film thickness of paste for external electrode (μm) | α/β | Thermal shock resistance | Fixing strength | Short circuit rate |
|---|---|---|---|---|---|
| 15 | 10 | 1 | ○ : 0% | ○ : 7% | ○ : 5% |
| 16 | 8 | 5/4 | ○ : 0% | ○ : 13% | ○ : 4% |
| 17 | 5 | 3/2 | ○ : 0% | ○ : 15% | ○ : 4% |

It was confirmed that short circuit defective rate was favorable when α/β was more than 1/40 and less than 1 (sample No. 10 to sample No. 14), compared with when α/P was 1/40 or less (sample No. 8 and sample No. 9).

As for sample No. 8 and sample No. 9, it is considered that coating the external electrodes too much leads to easy generation of conduction between one external electrode and the other external electrode due to extension of plating covering the external electrodes, and the short circuit defective rate was increased.

The fixing strength was favorable when α/β was more than 1/40 and less than 1 (sample No. 10 to sample No. 14), compared with when α/β was 1 or more (sample No. 15 to sample No. 17).

INDUSTRIAL APPLICABILITY

As described above, the multilayer electronic component according to the present invention is useful as an electronic part to be used in laptop computers or smart phones which are often used to have a great capacity while being compact.

EXPLANATIONS OF LETTERS OR NUMERALS 2, 102 . . . multilayer ceramic capacitor
3 . . . element body
4 . . . ceramic sintered body
6 . . . first external electrode
8 . . . second external electrode
10 . . . inner dielectric layer
10a . . . inner green sheet
11 . . . exterior region
11a . . . outer green sheet
12 . . . internal electrode layer
12A, 12B . . . lead portion
12a . . . internal electrode pattern layer
13 . . . interior region
13a . . . internal laminate
14 . . . capacity region
15A, 15B . . . lead region
16 . . . insulating layer
16a . . . insulating layer extension portion
16b . . . mountain portion
16b1 . . . first predetermined position
16b2 . . . peak
16b3 . . . second predetermined position
16c . . . plane portion
16c1 . . . plane end portion
20 . . . step absorbing layer
32 . . . gap between internal electrode pattern layers
104 . . . circuit board
106 . . . pressurizing jig

The invention claimed is:

1. A multilayer electronic component comprising:
an element body having an internal electrode layer and a dielectric layer, both of which are substantially parallel to a plane including a first axis direction and a second axis direction and are alternately laminated along a third axis direction;
a pair of side surfaces of the element body facing each other in the first axis direction that are respectively equipped with an insulating layer;
a pair of end surfaces of the element body facing each other in the second axis direction that are respectively equipped with an external electrode electrically connected to the internal electrode layer;
a mountain portion of the insulating layer formed on a peripheral edge of the side surface; and
a plane portion of the insulating layer at a central portion of the side surface,
wherein θ1 is 5° to 25°, and
θ2 is 5° to 25°,
where
θ1 denotes an angle made by a surface virtual line along a surface of the plane portion of the insulating layer and a tangential line of a curved surface at a first inner predetermined position of the mountain portion, and
θ2 denotes an angle made by the surface virtual line and a tangential line of a curved surface at a first outer predetermined position of the mountain portion.

2. A multilayer electronic component comprising:
an element body having an internal electrode layer and a dielectric layer, both of which are substantially parallel to a plane including a first axis direction and a second axis direction and are alternately laminated along a third axis direction;
a pair of side surfaces of the element body facing each other in the first axis direction that are respectively equipped with an insulating layer;
a pair of end surfaces of the element body facing each other in the second axis direction that are respectively equipped with an external electrode electrically connected to the internal electrode layer;
a mountain portion of the insulating layer formed on a peripheral edge of the side surface, the external electrode covering a portion of the insulating layer having a maximum width in the first axis direction at the mountain portion of an end portion of the insulating layer in the second axis direction; and
a plane portion of the insulating layer at a central portion of the side surface,
wherein $1/30 \leq \alpha/\beta < 1$ is satisfied,
where
α denotes a length along the second axis direction from an end portion in the second axis direction of the element body to the portion having the maximum width in the first axis direction at the mountain portion of the end portion in the second axis direction of the insulating layer, and
β denotes a covering length along the second axis direction of the external electrode covering the insulating layer from the end portion in the second axis direction of the element body.

3. A multilayer electronic component comprising:
an element body having an internal electrode layer and a dielectric layer, both of which are substantially parallel to a plane including a first axis direction and a second axis direction and are alternately laminated along a third axis direction;

a pair of side surfaces of the element body facing each other in the first axis direction that are respectively equipped with an insulating layer;

a pair of end surfaces of the element body facing each other in the second axis direction that are respectively equipped with an external electrode electrically connected to the internal electrode layer;

a mountain portion of the insulating layer formed on a peripheral edge of the side surface; and a valley portion of the insulating layer at a central portion of the side surface, wherein $\theta 1'$ is 5° to 25°, and $\theta 2'$ is 5° to 25°, where $\theta 1'$ denotes an angle made by a vertical virtual line vertical to the first axis of the insulating layer and a tangential line of a curved surface at a second inner predetermined position of the mountain portion, and $\theta 2'$ denotes an angle made by the vertical virtual line and a tangential line of a curved surface at a second outer predetermined position of the mountain portion.

* * * * *